(12) United States Patent
Bright et al.

(10) Patent No.: US 12,643,196 B2
(45) Date of Patent: Jun. 2, 2026

(54) SYSTEM AND METHOD FOR CONDUCTING AN ABRASIVE OPERATION IN AN ADDITIVE MANUFACTURING PROCESS

(71) Applicants: SAINT-GOBAIN ABRASIVES, INC., Worcester, MA (US); SAINT-GOBAIN SURFACE SOLUTIONS FRANCE, Conflans-Sainte-Honorine (FR)

(72) Inventors: Robin M. Bright, Charlton, MA (US); Christopher Arcona, Northborough, MA (US); Yinggang Tian, Shrewsbury, MA (US)

(73) Assignees: SAINT-GOBAIN ABRASIVES, INC., Worcester, MA (US); SAINT-GOBAIN SURFACE SOLUTIONS FRANCE, Conflans-Sainte-Honorine (FR)

( * ) Notice: Subject to any disclaimer, the term of this patent is extended or adjusted under 35 U.S.C. 154(b) by 450 days.

(21) Appl. No.: 17/996,617

(22) PCT Filed: Apr. 23, 2021

(86) PCT No.: PCT/US2021/028910
§ 371 (c)(1),
(2) Date: Oct. 19, 2022

(87) PCT Pub. No.: WO2021/217044
PCT Pub. Date: Oct. 28, 2021

(65) Prior Publication Data
US 2023/0158637 A1 May 25, 2023

Related U.S. Application Data

(60) Provisional application No. 63/014,488, filed on Apr. 23, 2020.

(51) Int. Cl.
| | |
|---|---|
| *B33Y 50/02* | (2015.01) |
| *B22F 10/66* | (2021.01) |
(Continued)

(52) U.S. Cl.
CPC .............. *B24B 51/00* (2013.01); *B22F 10/66* (2021.01); *B24B 49/183* (2013.01); *B33Y 40/20* (2020.01)

(58) Field of Classification Search
CPC ..................................................... B33Y 50/02
See application file for complete search history.

(56) References Cited

U.S. PATENT DOCUMENTS

| | | | |
|---|---|---|---|
| 985,116 | A | 2/1911 | Nichols |
| 2,242,877 | A | 5/1941 | Albertson |
(Continued)

FOREIGN PATENT DOCUMENTS

| | | | |
|---|---|---|---|
| AU | 613584 | B2 | 8/1991 |
| CN | 1147783 | A | 4/1997 |
(Continued)

OTHER PUBLICATIONS

Cao, S., et al., "Investigation on urea-formaldehyde resin as an in-powder adhesivefor the fabrication of Al2O3/borosilicate-glass composite parts bythree dimensional printing (3DP)", Journal of Materials Processing Technology 217 (2015) pp. 241-252.
(Continued)

*Primary Examiner* — Suresh Suryawanshi
(74) *Attorney, Agent, or Firm* — Abel Schillinger, LLP; Arpan Ghosh

(57) ABSTRACT

A method for conducting an abrasive operation can include providing a fixed abrasive article and separating a first part from a second part using the fixed abrasive article according to a deterministic process.

20 Claims, 11 Drawing Sheets

(51) Int. Cl.
  *B24B 49/18* (2006.01)
  *B24B 51/00* (2006.01)
  *B33Y 40/20* (2020.01)

(56) References Cited

U.S. PATENT DOCUMENTS

| | | | |
|---|---|---|---|
| RE22,457 E | 3/1944 | Jeppson et al. | |
| 2,367,404 A | 1/1945 | Kott | |
| 3,023,551 A | 3/1962 | Osenberg | |
| 3,123,948 A | 3/1964 | Kistler et al. | |
| 3,144,739 A | 8/1964 | Brutvan et al. | |
| 3,146,560 A | 9/1964 | Edward | |
| 3,258,817 A | 7/1966 | Smiley | |
| 3,477,180 A | 11/1969 | Robertson | |
| 3,594,141 A | 7/1971 | Houston et al. | |
| 3,609,925 A | 10/1971 | Cornella-Riera | |
| 3,650,714 A | 3/1972 | Farkas | |
| 3,871,840 A | 3/1975 | Wilder et al. | |
| 4,128,971 A | 12/1978 | Dunnington et al. | |
| 4,164,098 A | 8/1979 | Akita | |
| 4,211,294 A | 7/1980 | Multakh | |
| 4,274,769 A | 6/1981 | Multakh | |
| 4,314,827 A | 2/1982 | Leitheiser et al. | |
| 4,369,046 A | 1/1983 | Bruschek et al. | |
| 4,483,108 A | 11/1984 | Howard | |
| 4,552,231 A | 11/1985 | Pay et al. | |
| 4,574,003 A | 3/1986 | Gerk | |
| 4,623,364 A | 11/1986 | Cottringer et al. | |
| 4,661,126 A | 4/1987 | Inagami et al. | |
| 4,744,802 A | 5/1988 | Schwabel | |
| 4,770,671 A | 9/1988 | Monroe et al. | |
| 4,881,951 A | 11/1989 | Monroe et al. | |
| 4,918,872 A | 4/1990 | Sato et al. | |
| 4,923,512 A | 5/1990 | Timm et al. | |
| 4,960,441 A | 10/1990 | Pellow et al. | |
| 5,011,508 A | 4/1991 | Wald et al. | |
| 5,067,969 A | 11/1991 | Matsuda | |
| 5,090,968 A | 2/1992 | Pellow | |
| 5,092,920 A | 3/1992 | Nakai et al. | |
| 5,123,217 A | 6/1992 | Ishikawa et al. | |
| 5,139,978 A | 8/1992 | Wood | |
| 5,178,644 A | 1/1993 | Huzinec | |
| 5,178,849 A | 1/1993 | Bauer | |
| 5,201,916 A | 4/1993 | Berg et al. | |
| 5,204,055 A | 4/1993 | Sachs et al. | |
| 5,227,104 A | 7/1993 | Bauer | |
| 5,252,264 A | 10/1993 | Forderhase et al. | |
| 5,282,875 A | 2/1994 | Wood et al. | |
| 5,354,155 A | 10/1994 | Adams | |
| 5,366,523 A | 11/1994 | Rowenhorst et al. | |
| 5,387,380 A | 2/1995 | Cima et al. | |
| 5,429,647 A | 7/1995 | Larmie | |
| 5,441,710 A | 8/1995 | Marois | |
| 5,449,388 A | 9/1995 | Wiand | |
| 5,490,882 A | 2/1996 | Sachs et al. | |
| 5,498,269 A | 3/1996 | Larmie | |
| 5,518,443 A | 5/1996 | Fisher | |
| 5,547,479 A | 8/1996 | Conwell et al. | |
| 5,551,963 A | 9/1996 | Larmie | |
| 5,611,724 A | 3/1997 | Degraaff | |
| 5,618,762 A | 4/1997 | Shirakawa et al. | |
| 5,660,621 A | 8/1997 | Bredt | |
| 5,725,162 A | 3/1998 | Garg et al. | |
| 5,766,277 A | 6/1998 | DeVoe et al. | |
| 5,776,214 A | 7/1998 | Wood | |
| 5,868,125 A | 2/1999 | Maoujoud | |
| 5,874,050 A | 2/1999 | Matias | |
| 5,891,206 A | 4/1999 | Ellingson | |
| 5,900,207 A | 5/1999 | Danforth et al. | |
| 5,942,015 A | 8/1999 | Culler et al. | |
| 5,976,205 A | 11/1999 | Andrews et al. | |
| 5,996,571 A | 12/1999 | Jedick | |
| 6,086,648 A | 7/2000 | Rossetti et al. | |
| 6,123,744 A | 9/2000 | Huzinec | |
| 6,146,567 A | 11/2000 | Sachs et al. | |
| 6,192,875 B1 | 2/2001 | Koroku et al. | |
| 6,209,420 B1 | 4/2001 | Butcher et al. | |
| 6,354,362 B1 | 3/2002 | Smith et al. | |
| 6,376,590 B2 | 4/2002 | Kolb et al. | |
| 6,403,002 B1 | 6/2002 | van der Geest | |
| 6,413,286 B1 | 7/2002 | Swei et al. | |
| 6,416,560 B1 | 7/2002 | Palmgren | |
| 6,511,265 B1 | 1/2003 | Mirchandani et al. | |
| 6,551,366 B1 | 4/2003 | D'Souza et al. | |
| 6,593,391 B2 | 7/2003 | Teutsch et al. | |
| 6,645,412 B2 | 11/2003 | Priedeman, Jr. | |
| 6,749,496 B2 | 6/2004 | Mota et al. | |
| 6,767,499 B1 | 7/2004 | Hory et al. | |
| 6,814,926 B2 | 11/2004 | Geving et al. | |
| 6,858,050 B2 | 2/2005 | Palmgren | |
| 7,015,268 B2 | 3/2006 | Manwiller et al. | |
| 7,020,539 B1 | 3/2006 | Kovacevic et al. | |
| 7,125,490 B2 | 10/2006 | Clendenning et al. | |
| 7,311,752 B2 | 12/2007 | Tepper et al. | |
| 7,332,140 B2 | 2/2008 | Matias | |
| 7,497,977 B2 | 3/2009 | Nielsen et al. | |
| 7,524,345 B2 | 4/2009 | Nevoret et al. | |
| 7,867,302 B2 | 1/2011 | Nevoret et al. | |
| 7,875,091 B2 | 1/2011 | Nevorct et al. | |
| 7,883,563 B2 | 2/2011 | Kawata et al. | |
| 7,887,608 B2 | 2/2011 | Schwabel et al. | |
| 7,946,907 B2 | 5/2011 | Heyen | |
| 8,109,177 B2 | 2/2012 | Kembaiyan | |
| 8,252,087 B2 | 8/2012 | Burba, III et al. | |
| 8,308,830 B2 | 11/2012 | Egan et al. | |
| 8,486,490 B2 | 7/2013 | Fuwa et al. | |
| 8,568,205 B2 | 10/2013 | Gosamo et al. | |
| 8,597,088 B2 | 12/2013 | Hoang et al. | |
| 8,668,859 B2 | 3/2014 | Pettis | |
| 8,715,381 B2 | 5/2014 | Ramanath et al. | |
| 8,778,252 B2 | 7/2014 | Mackie et al. | |
| 8,870,571 B2 | 10/2014 | Lowder et al. | |
| 8,991,211 B1 | 3/2015 | Arlotti et al. | |
| 9,144,237 B2 | 9/2015 | Sakurada et al. | |
| 9,156,999 B2 | 10/2015 | Ng et al. | |
| 9,388,898 B2 | 7/2016 | Tokumo | |
| 9,421,666 B2 | 8/2016 | Krishnan et al. | |
| 9,456,884 B2 | 10/2016 | Uckelmann et al. | |
| 9,545,669 B2 | 1/2017 | ÅKlint et al. | |
| 9,597,730 B2 | 3/2017 | Mironets et al. | |
| 9,731,982 B2 | 8/2017 | Adams | |
| 9,776,304 B2 | 10/2017 | Schulze | |
| 9,783,718 B2 | 10/2017 | Stevenson et al. | |
| 9,815,029 B2 | 11/2017 | Zhong et al. | |
| 9,822,291 B2 | 11/2017 | Erickson | |
| 10,016,852 B2 | 7/2018 | Broda | |
| 10,052,742 B2 | 8/2018 | Fukazawa et al. | |
| 10,144,114 B2 | 12/2018 | Schulze | |
| 10,183,329 B2 | 1/2019 | Gunther | |
| 10,188,975 B2 | 1/2019 | Fu et al. | |
| 10,189,211 B2 | 1/2019 | Volk et al. | |
| 10,272,493 B2 | 4/2019 | Krebs et al. | |
| 10,328,372 B2 | 6/2019 | Mazumder et al. | |
| 10,399,201 B2 | 9/2019 | Ganapathiappan et al. | |
| 10,682,702 B2 | 6/2020 | Haro Gonzalez et al. | |
| 10,723,041 B2 | 7/2020 | Wang | |
| 10,882,160 B2 | 1/2021 | Redfield et al. | |
| 10,888,973 B2 | 1/2021 | Franke et al. | |
| 10,921,780 B2 | 2/2021 | Halperin | |
| 11,203,162 B2 | 12/2021 | Wighton et al. | |
| 11,577,458 B2 | 2/2023 | Rifaut et al. | |
| 2002/0095875 A1 | 7/2002 | D'Evelyn et al. | |
| 2003/0150442 A1 | 8/2003 | Boland et al. | |
| 2004/0226405 A1 | 11/2004 | Geving et al. | |
| 2004/0244540 A1 | 12/2004 | Oldham et al. | |
| 2004/0248770 A1 | 12/2004 | Grau et al. | |
| 2005/0101237 A1 | 5/2005 | Vecchiarelli et al. | |
| 2006/0059785 A1 | 3/2006 | Sung | |
| 2006/0162967 A1 | 7/2006 | Brackin et al. | |
| 2006/0185255 A1 | 8/2006 | Nevoret et al. | |
| 2006/0185256 A1 | 8/2006 | Nevoret et al. | |
| 2006/0185257 A1 | 8/2006 | Nevoret et al. | |
| 2006/0208388 A1 | 9/2006 | Bredt et al. | |
| 2006/0231293 A1 | 10/2006 | Ladi et al. | |

(56) References Cited

U.S. PATENT DOCUMENTS

| | | |
|---|---|---|
| 2007/0020457 A1 | 1/2007 | Adefris |
| 2007/0241482 A1 | 10/2007 | Giller et al. |
| 2008/0085660 A1 | 4/2008 | Orlhac |
| 2008/0182017 A1 | 7/2008 | Singh et al. |
| 2008/0187769 A1 | 8/2008 | Huzinec et al. |
| 2010/0035530 A1 | 2/2010 | Gosamo et al. |
| 2010/0193254 A1 | 8/2010 | Lind et al. |
| 2010/0193255 A1 | 8/2010 | Stevens et al. |
| 2010/0255254 A1 | 10/2010 | Culler et al. |
| 2010/0320005 A1 | 12/2010 | Burhan et al. |
| 2011/0243675 A1 | 10/2011 | Fach |
| 2011/0293918 A1 | 12/2011 | Lucas et al. |
| 2012/0298425 A1 | 11/2012 | Cuillier De Maindreville et al. |
| 2013/0052453 A1 | 2/2013 | Filou et al. |
| 2013/0168071 A1 | 7/2013 | Hugelier et al. |
| 2013/0240479 A1 | 9/2013 | Moriya et al. |
| 2013/0277891 A1 | 10/2013 | Teulet |
| 2013/0280994 A1 | 10/2013 | Kang |
| 2013/0283700 A1 | 10/2013 | Bajaj et al. |
| 2013/0316149 A1 | 11/2013 | Atkins et al. |
| 2014/0069023 A1 | 3/2014 | Hoang et al. |
| 2014/0163717 A1 | 6/2014 | Das et al. |
| 2014/0239527 A1* | 8/2014 | Lee ...................... B29C 64/106 |
| | | 264/17 |
| 2014/0255198 A1 | 9/2014 | El-Wardany et al. |
| 2014/0262541 A1 | 9/2014 | Parsana et al. |
| 2015/0008046 A1 | 1/2015 | Cuillier De Maindreville et al. |
| 2015/0029071 A1 | 1/2015 | Hwang et al. |
| 2015/0069649 A1 | 3/2015 | Bai et al. |
| 2015/0089881 A1 | 4/2015 | Stevenson et al. |
| 2015/0126099 A1 | 5/2015 | Krishnan et al. |
| 2015/0183089 A1 | 7/2015 | Iyengar |
| 2015/0259986 A1 | 9/2015 | Stockey |
| 2015/0290771 A1 | 10/2015 | Li |
| 2015/0306664 A1 | 10/2015 | Aklint et al. |
| 2015/0330154 A1 | 11/2015 | Pearce et al. |
| 2015/0360289 A1 | 12/2015 | Liou et al. |
| 2015/0375368 A1 | 12/2015 | Gosamo |
| 2016/0010469 A1 | 1/2016 | Guo |
| 2016/0038866 A1 | 2/2016 | Gibson et al. |
| 2016/0110479 A1* | 4/2016 | Li ......................... A43D 1/025 |
| | | 703/1 |
| 2016/0159699 A1 | 6/2016 | Lazur |
| 2016/0184972 A1 | 6/2016 | Serebrennikov et al. |
| 2016/0193696 A1 | 7/2016 | McFarland et al. |
| 2016/0221122 A1 | 8/2016 | D'Orlando et al. |
| 2016/0271757 A1 | 9/2016 | Kanyanta et al. |
| 2016/0289520 A1 | 10/2016 | Bujnowski et al. |
| 2016/0332236 A1 | 11/2016 | Stoyanov |
| 2016/0368224 A1 | 12/2016 | Ooba et al. |
| 2017/0050241 A1 | 2/2017 | Thomas et al. |
| 2017/0057011 A1 | 3/2017 | Hyatt et al. |
| 2017/0066873 A1 | 3/2017 | Gardet |
| 2017/0072469 A1 | 3/2017 | Maderud et al. |
| 2017/0136540 A1 | 5/2017 | Dods |
| 2017/0144242 A1 | 5/2017 | McQueen et al. |
| 2017/0216915 A1 | 8/2017 | Holcomb et al. |
| 2017/0232512 A1 | 8/2017 | Joerger |
| 2017/0291372 A1 | 10/2017 | Milshtein et al. |
| 2017/0297106 A1 | 10/2017 | Myerberg et al. |
| 2017/0342303 A1 | 11/2017 | Stevenson et al. |
| 2018/0001548 A1 | 1/2018 | Dietrich et al. |
| 2018/0104793 A1 | 4/2018 | Franke et al. |
| 2018/0117793 A1 | 5/2018 | Wang |
| 2018/0126515 A1 | 5/2018 | Franke et al. |
| 2018/0133803 A1 | 5/2018 | Karuppoor |
| 2018/0178348 A1 | 6/2018 | Xiao et al. |
| 2018/0178351 A1 | 6/2018 | Lindvall et al. |
| 2018/0214988 A1 | 8/2018 | Alves |
| 2018/0237329 A1 | 8/2018 | Drewnowski et al. |
| 2018/0297278 A1 | 10/2018 | Fulop et al. |
| 2018/0305266 A1 | 10/2018 | Gibson et al. |
| 2018/0333781 A1 | 11/2018 | Ederer et al. |
| 2019/0022826 A1 | 1/2019 | Franke et al. |
| 2019/0047214 A1 | 2/2019 | Franke et al. |
| 2019/0112422 A1 | 4/2019 | Tallia et al. |
| 2019/0168305 A1 | 6/2019 | Boyle |
| 2019/0184641 A1 | 6/2019 | Swier et al. |
| 2019/0185351 A1 | 6/2019 | Huang et al. |
| 2019/0193159 A1* | 6/2019 | Gibson ................. B22F 3/1021 |
| 2019/0243339 A1 | 8/2019 | Katogi et al. |
| 2019/0329449 A1* | 10/2019 | Wang ...................... B28D 1/041 |
| 2019/0389138 A1 | 12/2019 | Franzen, Jr. et al. |
| 2020/0001429 A1 | 1/2020 | Rapaka et al. |
| 2020/0016725 A1* | 1/2020 | Adefris ................... B24D 3/06 |
| 2020/0016821 A1* | 1/2020 | Ohnishi ................. C09D 11/08 |
| 2020/0070311 A1 | 3/2020 | Smithson et al. |
| 2020/0079028 A1 | 3/2020 | Miller et al. |
| 2020/0101534 A1 | 4/2020 | Gibson |
| 2020/0139507 A1 | 5/2020 | Yamamura et al. |
| 2020/0230695 A1 | 7/2020 | Protzmann et al. |
| 2020/0368812 A1 | 11/2020 | Trump et al. |
| 2020/0384694 A1 | 12/2020 | Ceriani |
| 2021/0001452 A1 | 1/2021 | Xiao et al. |
| 2021/0023785 A1 | 1/2021 | Sosnowski et al. |
| 2021/0196436 A1 | 7/2021 | Raby et al. |
| 2021/0379836 A1 | 12/2021 | Fadurdo Orellana et al. |
| 2022/0203616 A1 | 6/2022 | Korten et al. |
| 2022/0282144 A1 | 9/2022 | Tanikella et al. |
| 2022/0332651 A1 | 10/2022 | Tanikella et al. |
| 2023/0111065 A1 | 4/2023 | Schumacher et al. |
| 2023/0211463 A1 | 7/2023 | Tanikella et al. |
| 2023/0211469 A1 | 7/2023 | Tanikella et al. |
| 2023/0211471 A1 | 7/2023 | Tanikella et al. |

FOREIGN PATENT DOCUMENTS

| | | | |
|---|---|---|---|
| CN | 1212494 C | 7/2005 | |
| CN | 1640596 A | 7/2005 | |
| CN | 1962061 A | 5/2007 | |
| CN | 102233269 B | 11/2011 | |
| CN | 101804603 B | 5/2012 | |
| CN | 102462996 A | 5/2012 | |
| CN | 102658528 A | 9/2012 | |
| CN | 102824789 A | 12/2012 | |
| CN | 102936141 A | 2/2013 | |
| CN | 202777185 U | 3/2013 | |
| CN | 103264361 A | 8/2013 | |
| CN | 103748309 A | 4/2014 | |
| CN | 104014215 A | 9/2014 | |
| CN | 104047547 A | 9/2014 | |
| CN | 102873401 B | 11/2014 | |
| CN | 203944262 U | 11/2014 | |
| CN | 203980474 U | 12/2014 | |
| CN | 203984693 U | 12/2014 | |
| CN | 104259892 A | 1/2015 | |
| CN | 104259892 B | 1/2015 | |
| CN | 104531065 B | 4/2015 | |
| CN | 104566665 A | 4/2015 | |
| CN | 104908166 A | 9/2015 | |
| CN | 104924499 A | 9/2015 | |
| CN | 104990154 A | 10/2015 | |
| CN | 105563352 A | 5/2016 | |
| CN | 105921793 A | 9/2016 | |
| CN | 106280528 A | 1/2017 | |
| CN | 106312843 A | 1/2017 | |
| CN | 106425898 A | 2/2017 | |
| CN | 106553137 A | 4/2017 | |
| CN | 106674876 A | 5/2017 | |
| CN | 104285281 B | 6/2017 | |
| CN | 106926446 A | 7/2017 | |
| CN | 106938335 A | 7/2017 | |
| CN | 107150154 A | 9/2017 | |
| CN | 107206570 A | 9/2017 | |
| CN | 105562825 B | 10/2017 | |
| CN | 107538359 A | 1/2018 | |
| CN | 107636109 A * | 1/2018 | ......... B24D 18/0009 |
| CN | 105649538 B | 2/2018 | |
| CN | 105415216 B | 3/2018 | |
| CN | 107825305 A | 3/2018 | |
| CN | 107838820 A | 3/2018 | |
| CN | 107866752 A | 4/2018 | |
| CN | 107866753 A | 4/2018 | |
| CN | 107900927 A | 4/2018 | |

(56) References Cited

FOREIGN PATENT DOCUMENTS

| CN | 107914216 A | 4/2018 |
| CN | 107921471 A | 4/2018 |
| CN | 108081158 A | 5/2018 |
| CN | 207415166 U | 5/2018 |
| CN | 108326764 A | 7/2018 |
| CN | 106493651 B | 10/2018 |
| CN | 108612482 A | 10/2018 |
| CN | 108620583 A | 10/2018 |
| CN | 108747868 A | 11/2018 |
| CN | 208132742 U | 11/2018 |
| CN | 208132743 U | 11/2018 |
| CN | 208132744 U | 11/2018 |
| CN | 109157296 A | 1/2019 |
| CN | 208543373 U | 2/2019 |
| CN | 109483418 A | 3/2019 |
| CN | 109534845 A | 3/2019 |
| CN | 110340817 A | 10/2019 |
| CN | 210452395 U | 5/2020 |
| CN | 109366374 B | 11/2020 |
| DE | 3937697 A1 | 5/1991 |
| DE | 19834559 A1 | 2/2000 |
| DE | 19909882 A1 | 9/2000 |
| DE | 102009006189 A1 | 7/2010 |
| DE | 102015115406 A1 | 3/2017 |
| DE | 102017221111 A1 | 6/2018 |
| DE | 102017113369 A1 | 12/2018 |
| DE | 202018104180 U1 | 12/2018 |
| DE | 10-2019-219859 A1 | 6/2021 |
| DE | 10-2019-219867 A1 | 6/2021 |
| EP | 0127339 B1 | 3/1988 |
| EP | 1066134 B1 | 5/2002 |
| EP | 1878486 A1 | 1/2008 |
| EP | 3053677 A1 | 8/2016 |
| EP | 1778601 B1 | 9/2017 |
| EP | 3281695 A1 | 2/2018 |
| EP | 2025454 B1 | 4/2018 |
| EP | 3009233 A1 | 12/2018 |
| EP | 3418002 A1 | 12/2018 |
| EP | 3307483 B1 | 6/2020 |
| GB | 2527938 A | 1/2016 |
| JP | H02237759 A | 9/1990 |
| JP | H04372366 A | 12/1992 |
| JP | H05046404 U | 6/1993 |
| JP | H0691536 A | 4/1994 |
| JP | H06315881 A | 11/1994 |
| JP | H0811051 A | 1/1996 |
| JP | H09309108 A | 12/1997 |
| JP | 2982661 B2 | 11/1999 |
| JP | H11322408 A | 11/1999 |
| JP | 3086103 B2 | 9/2000 |
| JP | 2002-248691 A | 9/2002 |
| JP | 2005199619 A | 7/2005 |
| JP | 2006187848 A | 7/2006 |
| JP | 2008119312 A | 5/2008 |
| JP | 2008-302454 A | 12/2008 |
| JP | 2010527888 A | 8/2010 |
| JP | 2014000155 A | 1/2014 |
| JP | 2014-221499 A | 11/2014 |
| JP | 2014529523 A | 11/2014 |
| JP | 2016049579 A | 4/2016 |
| JP | 5996195 B2 | 9/2016 |
| JP | 2016172306 A | 9/2016 |
| JP | 6010834 B2 | 10/2016 |
| JP | 2017-154411 A | 9/2017 |
| JP | 6643643 B2 | 2/2020 |
| JP | 2021120201 A | 8/2021 |
| KR | 10-0578045 B1 | 5/2006 |
| KR | 10-1062801 B1 | 9/2011 |
| KR | 20150117723 A | 10/2015 |
| KR | 101760271 B1 | 7/2017 |
| KR | 10-2018-0129059 A | 12/2018 |
| KR | 10-2323009 B1 | 11/2021 |
| MX | 2011001443 A | 4/2011 |
| RU | 2358854 C1 * | 6/2009 | ............ B24D 11/00 |
| WO | 93-25336 A1 | 12/1993 |
| WO | 94-02562 A1 | 2/1994 |
| WO | 96-33638 A1 | 10/1996 |
| WO | 98-56566 A1 | 12/1998 |
| WO | 99-15293 A1 | 4/1999 |
| WO | 99-48646 A1 | 9/1999 |
| WO | 01-72502 A1 | 10/2001 |
| WO | 2003026714 A1 | 4/2003 |
| WO | 2003092748 A1 | 11/2003 |
| WO | 03-106148 A1 | 12/2003 |
| WO | 2004-110719 A2 | 12/2004 |
| WO | 2005075000 A1 | 8/2005 |
| WO | 2007026387 A2 | 3/2007 |
| WO | 2009009558 A1 | 1/2009 |
| WO | 2010016959 A2 | 2/2010 |
| WO | 2013-026972 A1 | 2/2013 |
| WO | 2014-140689 A1 | 9/2014 |
| WO | 2014137890 A1 | 9/2014 |
| WO | 2014-165390 A1 | 10/2014 |
| WO | 2014161816 A2 | 10/2014 |
| WO | 2015-069849 A1 | 5/2015 |
| WO | 2016022449 A1 | 2/2016 |
| WO | 2016032883 A1 | 3/2016 |
| WO | 2016-058091 A1 | 4/2016 |
| WO | 2016123505 A1 | 8/2016 |
| WO | 2016-192140 A1 | 12/2016 |
| WO | 2016-209696 A1 | 12/2016 |
| WO | 2016-210057 A1 | 12/2016 |
| WO | 2017-007999 A1 | 1/2017 |
| WO | 2017034951 A1 | 3/2017 |
| WO | 2017-137482 A1 | 8/2017 |
| WO | 2017127887 A1 | 8/2017 |
| WO | 2017-173009 A1 | 10/2017 |
| WO | 2017214179 A1 | 12/2017 |
| WO | 2018010730 A2 | 1/2018 |
| WO | 2018-080778 A1 | 5/2018 |
| WO | 2018118566 A1 | 6/2018 |
| WO | 2018160297 A1 | 9/2018 |
| WO | 2019187112 A1 | 10/2019 |
| WO | 2019194823 A1 | 10/2019 |
| WO | 2019210111 A2 | 10/2019 |
| WO | 2019230214 A1 | 12/2019 |
| WO | 2019245534 A1 | 12/2019 |
| WO | 2020012501 A1 | 1/2020 |
| WO | 2020102025 A1 | 5/2020 |
| WO | 2020-128779 A2 | 6/2020 |
| WO | 2020220143 A1 | 11/2020 |
| WO | 2021-001730 A1 | 1/2021 |
| WO | 2021-009673 A1 | 1/2021 |
| WO | 2021-038438 A1 | 3/2021 |
| WO | 2021-038465 A1 | 3/2021 |
| WO | 2021072173 A1 | 4/2021 |
| WO | 2021076986 A1 | 4/2021 |
| WO | 2021-116859 A1 | 6/2021 |
| WO | 2021119290 A1 | 6/2021 |
| WO | 2021119319 A1 | 6/2021 |
| WO | 2021156730 A1 | 8/2021 |
| WO | 2021221918 A1 | 11/2021 |
| WO | 2022006201 A1 | 1/2022 |
| WO | 2022-107038 A1 | 5/2022 |
| WO | 2022090904 A1 | 5/2022 |
| WO | 2022187721 A1 | 9/2022 |
| WO | 2023130059 A1 | 7/2023 |
| WO | 2023130082 A1 | 7/2023 |
| WO | 2023130088 A1 | 7/2023 |

OTHER PUBLICATIONS

Melcher, R., et al., "Fabrication of Al2O3-based composites by indirect 3D-printing", Materials Letters 60 (2006) pp. 572-575.
Seleznev, Maxim, et al., "Novel Near-Net-Shape Tool-Less Method for Manufacturing Cast Metal Matrix Composites: Three-Dimensional Printing of Ceramic Preforms Combined with Invest-ment Casting Technology", SAE Transactions, vol. 109, Section 5: Journal of Materials & Manufacturing (2000), pp. 235-242.
Winkel, Alexander, et al., "Sintering of 3D-Printed Glass/Hap Composites", Journal of the American Ceramic Society, vol. 95, No. 11, Nov. 2012, pp. 3387-3393.

(56) References Cited

OTHER PUBLICATIONS

Zhang, Wei, et al., "Three-Dimensional Printing of Complex-Shaped Alumina/Glass Composites", Advanced Engineering Materials 2009, 11, No. 12, pp. 1038-1043.

Spierings, Adriaan Bernardus, et al., "Processing of metal-diamond-composites using selective laser melting", Rapid Prototyping Journal, vol. 21, No. 2, 2015, pp. 130-136.

Zocca, Andrea, et al., "Additive Manufacturing of Ceramics: Issues, Potentialities, and Opportunities", Journal of the American Ceramic Society, Jul. 2015, vol. 98, No. 7, pp. 1983-2001.

Guo, Nannan, et al., "Additive Manufacturing: technology, applications and research needs," Front. Mech. Eng., 2013, 8(3), pp. 215-243.

Yin, Xiaowei, et al., "Three-Dimensional Printing of Nanolaminated Ti3AlC2 Toughened TiAl3—Al2O3 Composites," Journal of the American Ceramic Society, Jul. 2007, vol. 90, No. 7, pp. 2128-2134.

Rosso, M., "Ceramic and metal matrix composites: route and properties", Polytechnic of Turin, Dep. of Material Science and Chemical Engineering, 12th International Scientific Conference: Achievements in Mechanical and Materials Engineering, 16 pages.

Bak, David, "Rapid prototyping or rapid production? 3D printing processes move industry towards the latter", Assembly Automation, 2003, vol. 23, No. 4, pp. 340-345.

Search Results, Mar. 4, 2021, 14 pages.

3M Technology, "3D Printed Abrasives", YouTube Video, Uploaded Jun. 4, 2019, 1 page. <https://www.youtube.com/watch?v=TtYte11-BsM>.

"New Infographic: How It Works . . . Software-Driven 3D Post-Printing with AUTOMAT3D™", Jun. 20, 2018, 5 pages.

AmericaMakes, "Success Story: Hybrid Direct Manufacturing: Integrating Additive and Subtractive Methods—Improving Productivity by Integrating Automatic Finishing with Direct Metal Additive Manufacturing," 2017, 2 pages.

Kumbhar_N.N. et al., "Post Processing Methods used to Improve Surface Finish of Products which are Manufactured by Additive Manufacturing Technologies: A Review", J. Inst. Eng. India Ser. C (Aug. 2018) 99(4):481-487, 7 pages.

International Search Report from PCT Application No. PCT/US2019/029239 dated Sep. 11, 2019, 5 pages.

International Search Report from PCT Application No. PCT/US2020/056111 dated Feb. 10, 2021, 5 pages.

International Search Report from PCT Application No. PCT/US2020/064322 dated Mar. 16, 2021, 5 pages.

International Search Report for PCT/US2021/028910 dated Aug. 5, 2021, 4 pages.

International Search Report for PCT/US2022/019047 dated Jun. 17, 2022, 5 pages.

International Search Report for PCT/US2022/019046 dated Jun. 17, 2022, 4 pages.

Beyer, Dr. Peter, "Exploring the New Dimensions of 3D Abrasives Technology," The Meister Toolbox, Jul. 7, 2016, 2 pages.

Lewis, Jennifer A., et al., "Direct Ink Writing of Three-Dimensional Ceramic Structures," J. Am. Ceram. Soc., 89 [12] 3599-3609, 2006, 11 pages.

Cabala et al., "Silver nanoparticle surface functionalized alumina filters for disinfection of potable water," Material Today: Proceedings 2 (2015) 321-330.

Wehling et al. "Silver nanoparticle-doped zirconia capillaries for enhanced bacterial filtration." Material Science and Engineering C 48 (2015) 179-187.

Yang et al., "Development and Characterization of Porous Silver-Incorporated Hydroxyapatite Ceramic for Separation and Elimination of Microorganisms." Published online Wiley InterScience Aug. 29, 2006.

Li et al. "Removal and retention of viral aerosols by a novel alumina nanofiber filter." Aerosol Science 40 (2009) 65-71.

Negus et al., "Simple methods to incorporate silver and copper generate antmicrobial glasses and porous glass-bonded ceramics." ACS bulletin vol. 96, No. 5.

Tepper, et al., "Novel Nanofibre Filter Medium Attracts Waterborne Pathogens," Jul./Aug. 2002, www.filtsep.com, 4 pages.

Virus Absorbing Air Filter, 21.2, (1991), 521-523.

International Search Report for Application No. PCT/US2020/064282 dated Apr. 8, 2021, 3 pages.

International Search Report & Written Opinion for PCT/US2017/058808, mailed Feb. 19, 2018, 12 pages.

International Search Report for Application No. PCT/US2022/082650 dated May 4, 2023, 4 pages.

International Search Report for Application No. PCT/US2022/082641 dated May 2, 2023, 4 pages.

International Search Report for Application No. PCT/US2022/082606 dated May 9, 2023, 4 pages.

ExOne Binder Jetting Technology, "What is Binder Jetting?", <https://www.exone.com/en-US/case-studies/what-is- binder-jetting>, retrieved Oct. 3, 2019, 2 pages.

Abrasive Technology—Current Development and Applications I, Proceedings of the Third International Conference on Abrasive Technology (ABTEC '99), Brisbane, Australia, Nov. 1999, 556 pages (Abstract).

Beyer, Dr. Peter, "Exploring the New Dimensions of 3D Abrasives Technology," The Meister Toolbox, Jul. 7, 2016, 2 pages, <https://meister-abrasives-toolbox.com/2016/07/07/exploring-the-new-dimensions-of-3d-abrasives-technology/>.

Doremalen, et al., "Aerosol and Surface Stability of SARS-CoV-2 as Compared with SARS-CoV-1", The New England Journal of Medicine, 382;16, Apr. 16, 2020, 4 pages <https://www.nejm.org/doi/full/10.1056/NEJMc2004973>.

Ensoll Tools, "CBN Wire Loops or Diamond Wire Loops is Fit for Metal Cutting?", <http://www.ensolltools.com/en/news/new-88-81.html> Accessed May 12, 2022.

Chaplin, Brian P., "Critical Review of Electrochemical Advanced Oxidation Proceses for Water Treatment Applications," Department of Chemical Engineering, University of Illinois at Chicago, Environmental Science: Processes and Impacts, The Royal Society of Chemistry, 2013, 24 pages.

Morawska, Lidia, et al., "Airborne transmission of SARS-CoV-2: The world should face the reality", International Laboratory for Air Quality and Health, Environment International 139 (2020) 105730.

Olsen, Sonja J., et al., "Transmission of the Severe Acute Respiratory Syndrome on Aircraft", The New England Journal of Medicine, 349:25, Dec. 18, 2003.

International Search Report & Written Opinion from PCT Application No. PCT/US2021/028910 dated Aug. 5, 2021, 11 pages.

Tian, Chenchen, et al., "Study on design and performance of metal-bonded diamond grinding wheels fabricated by selective laser melting (SLM)", Materials and Design 156 (2018), pp. 52-61 <https://doi.org/10.1016/j.matdes.2018.06.029>.

Tian, Chenchen, et al., "The effect of porosity on the mechanical property of metal-bonded diamond grinding wheel fabricated by selective laser melting (SLM)", Materials Science & Engineering A 743 (2019), pp. 697-706 <https://doi.org/10.1016/j.msea.2018.11.138>.

Tian, Chenchen, et al., "Porous structure design and fabrication of metal-bonded diamond grinding wheel based on selective laser melting (SLM)", The International Journal of Advanced Manufacturing Technology (2019) 100: 1451-1462 <https://doi.org/10.1007/s00170-018-2734-y>.

Tian, Chenchen, et al., "Study on formability, mechanical property and finite element modeling of 3D-printed composite for metal-bonded diamond grinding wheel application", Journal of Manufacturing Processes 54 (2020), pp. 38-47 <https://doi.org/10.1016/j.jmapro.2020.02.028>.

Qiu, Yanfei, et al., "Effect of additive particles on the performance of ultraviolet-cured resin-bond grinding wheels fabricated using additive manufacturing technology", The International Journal of Advanced Manufacturing Technology (2018) 97: 9873-3882 <https://doi.org/10.1007/s00170-018-2231-3>.

Yang, Zhibo, et al., "A study on diamond grinding wheels with regular grain distribution using additive manufacturing (AM) technology", Materials and Design 104 (2016) pp. 292-297 <http://dx.doi.org/10.1016/j.matdes.2016.04.104>.

(56)          References Cited

OTHER PUBLICATIONS

Du, Zhi-jun, et al., "Selective laser sintering and grinding performance of resin bond diamond grinding wheels with arrayed internal cooling holes", Ceramics International 45 (2019) pp. 20873-20881 <https://doi.org/10.1016/j.ceramint.2019.07.076>.

3M, "3D Printed Superabrasives", 2024, 6 pages <https://www.3m.com/3M/en_US/metalworking-us/applications/grinding/precision-grinding/technology/superabrasives/precision-structured-wheels/>.

3M, "Precision Grinding and Microfinishing", 2024, 3 pages <https://www.3m.com/3M/en_US/metalworking-us/applications/grinding/precision-grinding/>.

3M, "Precision Grinding and Finishing Technology", 2024, 3 pages <https://www.3m.com/3M/en_US/metalworking-us/applications/grinding/precision-grinding/featured-technology/>.

Mishek, Danny, "Time and Money Saved with RP/RT Strategy", Apr. 1, 2007, 4 pages <https://www.moldmakingtechnology.com/articles/time-and-money-saved-with-rp-rt-strategy>.

Yang, Zhibo, et al., "Interface Microstructure and Formation Mechanism of Diamond Abrasives Laser Brazed with Ni—Cr Solder", Rare Metal Materials and Engineering, 45, 5, 1152-1156, 2016, Abstract Only.

Sears, James W., "Developing New Applications Based on Laser Additive Manufacturing of WC Cermets and WC Forming Alloys (Invited Paper)", Chinese Journal of Lasers, 36, 12, 3245-3250, 2009, Abstract Only.

Webster, J., et al., "Innovations in abrasive products for precision grinding", CIRP Annals—Manufacturing Technology, 53, 2, 597-617, 2004Conference: 54th General Assembly of CIRP, Krakow, Poland, Aug. 22-28, 2004, Abstract Only.

Maekawa, K., et al., "Fabrication of metal-bonded grinding/polishing tools by greentape laser sintering method", Precision Machining of Advanced Materials, 196, 133-140, 2001, Abstract Only.

Yang, Zhibo, et al., "3D Printing of Diamond Tools for Dental Ceramics Processing", Advanced Engineering Materials, 20, 3, 2018 Language: English, Abstract Only.

Peng, Ruitao, et al., "Performance of a pressurized internal-cooling slotted grinding wheel system", International Journal of Advanced Manufacturing Technology, 94, 5-8, 2239-2254, 2018, Abstract Only.

Stoyanov, Pantcho, et al., "Microstructural and mechanical characterization of Mo- containing Stellite alloys produced by three dimensional printing", Procedia CIRP 45 (2016) pp. 167-170.

Myers, Kyle, "Structure-Property Relationship of Binder Jetted Fused Silica Preforms to Manufacture Ceramic-Metallic Interpenetrating Phase Composites", Youngstown State University, May 2016, 252 pages.

Search Results, Apr. 19, 2019, 18 pages.

Search Results, May 2020, 11 pages.

Search Results, Nov. 2022, 7 pages.

Advanti Technology P L, "3D Metal Printer ExOne" May 1, 2014 <https://www.youtube.com/watch?v=Zql0B0V-ttw>.

Xu, Xipeng, et al., "The fabrication of grinding wheels with 3-dimensional controllable abrasives arrangement using stereolithography apparatus method"; Huaqiao University, China, 2nd International Conference on 3D Printing Technology and Innovations, 2018, abstract only.

Lu, Jing, et al., "Protecting diamond abrasive from being corroded in the vitrified bond wheel manufactured by 3D printing", Institute of Manufacturing Engineering, Huaqiao University, Xiamen, P.R. China, 2nd International Conference on 3D Printing Technology and Innovations, 2018, abstract only.

Yang, Zhibo, Li Kaiqiang, Hu Junchen, Zhang Shiyu. Temperature field simulation of grinding wheel preparation by selective laser sintering of nickel-based binder[J]. Heat Treatment of Metals, 2018, 43(10): 210-216, abstract only.

Zhang, Shubo, et al., "The design and fabrication of porous sintered grinding wheel based on Selective Laser Melting technology", Journal of Physics: Conference Series, vol. 1074, 2018, 10 pages <DOI: 10.1088/1742-6596/1074/1/012157>.

Tanaka, T., et al., "New development of a grinding wheel with resin cured by ultraviolet light", Journal of Materials Processing Technology, vol. 113, Issues 1-3, Jun. 15, 2001, pp. 385-391, abstract only.

Tanaka, T., et al., "Development of Grinding Wheels by Stereolithography and Investigation of their Characteristics", Key Engineering Materials, Apr. 2003, 238-239:277-282, abstract only <DOI: 10.4028/www.scientific.net/KEM.238-239.277>.

Okushima, Kenichi, et al., "Development of resin-bonded grinding wheel by stereolithography", Journal of the Japan Society for Precision Engineering 69(10): 1459-1463, Oct. 2003, abstract only <DOI: 10.2493/jjspe.69.1459>.

Yamamoto, Daiki, et al., "ELID grinding wheel fabrication technology applying PELID and 3D printer" Journal of the Japan Society for Abrasive Technology, 2016, vol. 60, Issue 5, pp. 267-268, abstract only <DOI: https://doi.org/10.11420/jsat.60.267>.

Tsukada, Namiki, et al., "Construction of laminated grinding wheel production system using PELID", Jan. 2016, The Proceedings of the Conference on Information Intelligence and Precision Equipment IIP 2016:H-2-3, abstract only <DOI: 10.1299/jsmeiip.2016.H-2-3>.

Iinuma, Ryosuke et al., "Grinding wheel fabrication using twin nozzle PELID and its characteristics", Jan. 2017, The Proceedings of Ibaraki District Conference 2017.25:715, abstract only <DOI: 10.1299/jsmeibaraki.2017.25.715>.

Ohno, Ryouhei, et al., "Development of ELID grinding wheel using PELID and nano-diamond", 2016, 2 pages, English abstract.

Saito, Hiroki, et al., "Development of Resin ball grinding wheel using PELID", Jan. 2016, The Proceedings of Ibaraki District Conference 2016.24:709, abstract only <DOI: 10.1299/jsmeibaraki.2016.24.709>.

Yano, Toui, et al., "Development and evaluation of ELID grinding wheel using 3D printer and PELID", Jan. 2017, The Proceedings of Ibaraki District Conference 2017.25:714, Abstract only <DOI: 10.1299/jsmeibaraki.2017.25.714>.

Jimenez, Edgar Mendoza, et al., "Parametric analysis to quantify process input influence on the printed densities of binder jetted alumina ceramics," Additive Manufacturing 39 (2019) 100864, 9 pages.

Jimenez, Edgar Mendoza, et al., SI, "Parametric analysis to quantify process input influence on the printed densities of binder jetted alumina ceramics," Additive Manufacturing 39 (2019) 100864, 5 pages.

Li Ming, et al., "Binder Jetting Additive Manufacturing of Metals: A Literature Review", vol. 1: Additive Manufacturing; Manufacturing Equipment and Systems; Bio and Sustainable Manufacturing, vol. 1, Jun. 10, 2019 (Jun. 10, 2019), XP055954813, DOI: 10.1115/MSEC2019-2994, ISBN: 978-0-7918-5874-5 *table 4*.

Baesso I et al.: "Characterization of powder flow behavior for additive manufacturing", Aug. 13, 2021, Additive Manufacturing, Elsevier, Amsterdam, NL, vol. 47, 3 pages, Abstract only.

Amado et al. "Advances in SLS Powder Characterization", Department of Mechanical and Process Engineering, 15 pages (2011) https://utw10945.utweb.utexas.edu/Manuscripts/2011/2011-33-Amado.pdf.

Pal Snehashis et al.: "The effects of locations on the build tray on the quality of specimens in powder bed additive manufacturing", The International Journal of Advanced Manufacturing Technology, vol. 112, No. 3-4, Jan. 2, 2021 (Jan. 2, 2001), pp. 1159-1170, XP037334436, ISSN: 0268-3768, DOI: 10.1007/S00170-020-06563-5.

* cited by examiner

SYSTEM AND METHOD FOR CONDUCTING AN ABRASIVE OPERATION IN AN ADDITIVE MANUFACTURING PROCESS

CROSS-REFERENCE TO RELATED APPLICATIONS

This application is a National Stage entry under 35 U.S.C. § 371 of International Application No. PCT/US2021/028910, filed Apr. 23, 2021, entitled "SYSTEM AND METHOD FOR CONDUCTING AN ABRASIVE OPERATION," by Robin M. BRIGHT et al., which claims priority to U.S. Provisional Patent Application No. 63/014,488, filed Apr. 23, 2020, entitled "SYSTEM AND METHOD FOR CONDUCTING AN ABRASIVE OPERATION," by Robin M. BRIGHT et al., of which both applications are assigned to the current assignees hereof and incorporated herein by reference in their entireties.

TECHNICAL FIELD

The following is directed to a system and method for conducting an abrasive operation, and particularly, to an abrasive operation including separating a first part from a second part using a fixed abrasive article, wherein the first part comprises an additive manufactured component.

BACKGROUND ART

Additive manufacturing processes often involve formation of a body through an additive process, as opposed to a subtractive process. For example, in some situations, a desired body is built from a surface of a build plate. After the forming of the three-dimensional body, the body needs to be removed from the build plate for further processing, and the build plate has to be resurfaced and prepared for the next build cycle. There exists a need for improving the finishing of parts formed through additive manufacturing.

BRIEF DESCRIPTION OF THE DRAWINGS

The present disclosure may be better understood, and its numerous features and advantages made apparent to those skilled in the art by referencing the accompanying drawings.

FIG. 6 includes an arrangement of a machine learning system according to an embodiment.

DETAILED DESCRIPTION OF THE PREFERRED EMBODIMENTS

Figure 1:
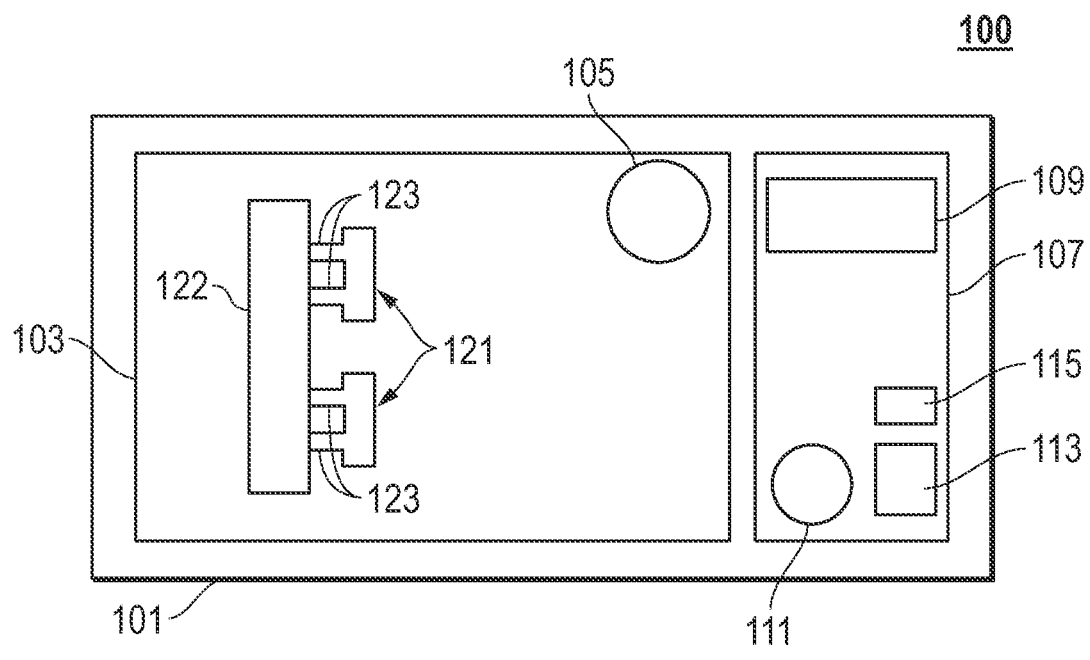
FIG. 1 includes a schematic view of a system according to one embodiment.

The following description in combination with the figures is provided to assist in understanding the teachings provided herein. The following disclosure will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

Embodiments disclosed herein are directed to a system and a method for conducting one or more material removal operations, including but not limited to, sectioning, grinding, surface-modification (e.g., grinding and/or polishing), and the like. The material removal operation may take many different forms, but may include finishing a portion of at least one additive manufactured component, such as separating a first part from a second part using an abrasive article, notably an abrasive article. As will be described in more detail herein, the abrasive article may be a fixed abrasive article, such as a bonded abrasive or coated abrasive, wherein one or more layers of abrasives are bonded to each other or a substrate via one or more bonding materials.

As used herein, the term "first part" includes a part made by additive manufacturing. Additive manufacturing can include processes which do not necessarily include a production tool or mold to form a body. Some non-limiting examples of additive manufacturing processes include powder bed fusion and selective material deposition techniques. For example, some particular processes may include binder jetting, selected laser sintering, selected laser melting, electron beam melting, directed energy deposition, laser metal deposition, direct metal deposition and the like. In one non-limiting embodiment, additive manufacturing may include any techniques described in accordance with ASTM F2792. In one non-limiting embodiment, the first part may include an additive manufactured component and a non-additive manufactured component. In another non-limiting embodiment, the first part consists only of an additive manufactured part.

The term "second part" may include a non-additive manufactured part or additive manufactured part. It does not necessarily need to include only a non-additive manufactured part. In fact, in a least one embodiment, at least a portion of the second part may be formed via additive manufacturing. In one non-limiting embodiment, the second part can include a build plate. For example, the second part may consist only of a build plate from which one or more additive manufactured parts can be formed.

Referring to the embodiment illustrated in FIG. 1, the system 100 can include a housing 101 including a building assembly 103 and a finishing assembly 107 that are integrated into the same housing 101. The building assembly 103 can include components suitable for forming three-dimensional bodies according to one or more additive manufacturing processes. These components are not illustrated for simplicity sake.

The housing 101, and particularly, the building assembly 103, may be used to form one or more parts via additive manufacturing. For example, as illustrated in FIG. 1, system 100 can include one or more first parts 121, one or more second parts 122, and one or more joint regions 123 between the one or more first and second parts 121 and 122.

According to one embodiment, the first part 121 may include any material suitable for use via additive manufacturing. For example, the first part may include an organic or inorganic material. In at least one embodiment, the first part 121 may include a metal or metal alloy, including for example, but not limited to a metal or metal alloy including a transition metal element. Some suitable, non-limiting examples of a metal or metal alloy can include titanium, nickel, nickel, cobalt, chromium, iron, or any combination thereof.

In another embodiment, the second part 122 may include any of the materials of the first part 121. In still another embodiment, the one or more joint regions 123 can include any of the materials of the first part. In one particular embodiment, the first part 121 and the joint region 123 may consist essentially of the same material. As described in embodiments herein, the joint region 123 may include one or more markings, features, or identifying structures, that may include alternative materials to those materials used in the first part 121 or the rest of the body used to form the joint region 123.

In one non-limiting embodiment, the one or more joint regions 123 can be formed by additive manufacturing and can connect the one or more first parts 121 to the one or more second parts 122. In a more particular embodiment, the second part 122 can be a build plate on which the one or more joint regions 123 and one or more first parts 121 may be formed via additive manufacturing.

While not illustrated in FIG. 1, it will be appreciated that the housing 101 can include at least on computing device for controlling aspects of the additive manufacturing process and/or the finishing process. In certain instances, the housing 101 can include a computing device for the building assembly 103 and a separate computing device for the finishing assembly 107 that is capable of communicating with the computing device for the building assembly 103.

The additive manufacturing housing can include one or more end effectors 105 and 111. Each end effector may be configured to assist with the movement and/or orientation of the first part 121, second part 122, joint region 123, and/or tools (e.g., an abrasive article) associated with the building and/or finishing operations. For example, the end effectors 105 and 111 may be robotic components. In one non-limiting embodiment, the build assembly 103 can have the end effector 105 and the finishing assembly can include the end effector 111. Each end effector 105 and 111 may be dedicated to only those processes within their respective assemblies. Alternatively, each of the end effectors 105 and 111 can work cooperatively in one or both of the assemblies 103 and 107. In one embodiment, each of the end effectors 105 and 111 can be controlled by one or more controllers that may be incorporated into one or more computing devices.

In one aspect, the system can include a manipulator 115. The manipulator 115 can be the same or different from the one or more end effectors 105 and 111. The manipulator 115 can be specifically configured to engage at least one of the first part 121 or the second part 122 during separation of the first part 121 from the second part 122. In a particular aspect, the manipulator 115 can be configured to change the position of at least one of the first part 121 or the second part 122 based on instructions received from one or more computing devices. In another non-limiting embodiment, the manipulator 115 can be configured to support the first part 121 during a separation process to avoid the first part 121 falling or becoming damaged. In one alternative aspect, the manipulator 115 and the end effector 111 can be communicatively coupled and work cooperatively according to the separation model to facilitate the finishing process.

According to one embodiment, the process of using the system 100 may include first, optionally, providing a second body 122. In one non-limiting embodiment, the second body can include a build plate, which is a substrate from which certain additive manufacturing processes form the three-dimensional bodies. In one optional embodiment, a second body 122, such as a build plate, may be placed in the building assembly. In some, but not all instances, the surface of the build plate may have certain characteristics to facilitate formation of a three-dimensional body via additive manufacturing thereon. In an embodiment, the size of the second body 122 may depend upon data related to the types of fixed abrasives available, the wear status of one or more fixed abrasive articles, the ability of the finishing system to rotate the build plate, environmental data, sensor data, performance data, or any combination thereof.

In other additive manufacturing processes, a second body may not necessarily be needed to facilitate the formation of the three-dimensional body via additive manufacturing. Still, some finishing of the finally-formed three-dimensional body may be completed by the finishing assembly 107.

After providing the second body 122, the joint region 123 can be formed. The size and shape of the joint region may vary depending upon the composition of the first body 121, size of the first body 121, shape of the first body, relative orientation of the first body 121 to the second body 122, and the like. The size and shape of the joint region 123 may further vary depending upon the size of the second body may depend upon data related to the types of fixed abrasives available, the wear status of one or more fixed abrasive articles, the ability of the finishing system to rotate the build plate, environmental data, sensor data, performance data, or any combination thereof.

After forming the joint region 123, the first body 121 is formed. At least a portion of the first body can be formed by the same or different additive manufacturing process used to form the joint region 123. In at least one embodiment, the joint region 123 and first body 121 are formed by the same additive manufacturing process, and may be considered a monolithic body joined to the second body 122. The size and shape of first body 121 may further vary depending upon the size of the second body may depend upon data related to the types of fixed abrasives available, the wear status of one or more fixed abrasive articles, the ability of the finishing system to rotate the build plate environmental data, sensor data, performance data, or any combination thereof.

In one particular embodiment, the formation of the first via additive manufacturing can include real-time measurement of the additive manufacturing process by one or more sensors, including for example, but not limited to a force sensor, optical sensor, or any combination thereof. The sensors can send sensor data to one or more computing devices. Thus, the separating process can include the creation of progress data, which may be sent to one or more computing devices, which can compare the progress data to other data or the model. Depending upon the comparison, the computing device may change one or more process parameters to adapt the separation process based on the progress data.

After forming the first part 121, the process can continue by finishing at least a portion of the first body 121, second body 122 and/or joint regions 123. Finishing can be conducted by one or more fixed abrasive articles, which are described in the embodiments herein.

In certain instances, the finishing assembly 107 may include a magazine 109 configured to include plurality of different types of tools. The tools may include various types of finishing tools, including for example, but not limited to, blades, wires, surface etchants, end mills, various fixed abrasive products (mounted points, non-woven abrasives, single-layered abrasives), and the like. In at least one embodiment, the magazine 109 may include only a plurality of fixed abrasive products, which may include a variety of different types of abrasive products. In one non-limiting embodiment, the magazine 109 may include a plurality of different types of abrasive articles, which is described in the embodiments herein. In one non-limiting embodiment, one or more of the end effectors (e.g., end effector 111) selects from the magazine 109, the fixed abrasive article suitable for conducting the material removal from the at least one joint region 123.

As will be appreciated, for those embodiments where a build plate and joint regions are not formed, one or more material removal operations may be conducted on the three-dimensional body formed via additive manufacturing by one or more fixed abrasive articles. In at least one embodiment, one or more surface finishing operations may be conducted on the first part 121 formed via additive manufacturing using a fixed abrasive, wherein the finishing operation is conducted in a deterministic process, which may be based on one or more models.

In a further aspect, the finishing housing or the building assembly can contain one or more sensors 113. The one or more sensors 113 may be used to control one or more aspects of the finishing process or additive manufacturing process. The one or more sensors 113 may be configured to send sensor data to one or more computing devices associated with the finishing assembly 107 and any components thereof, (e.g., end effector 111), the building assembly and any components thereof (e.g., end 105), a user, other computing device via wired or wireless communication protocols or any combination thereof.

Figure 2:
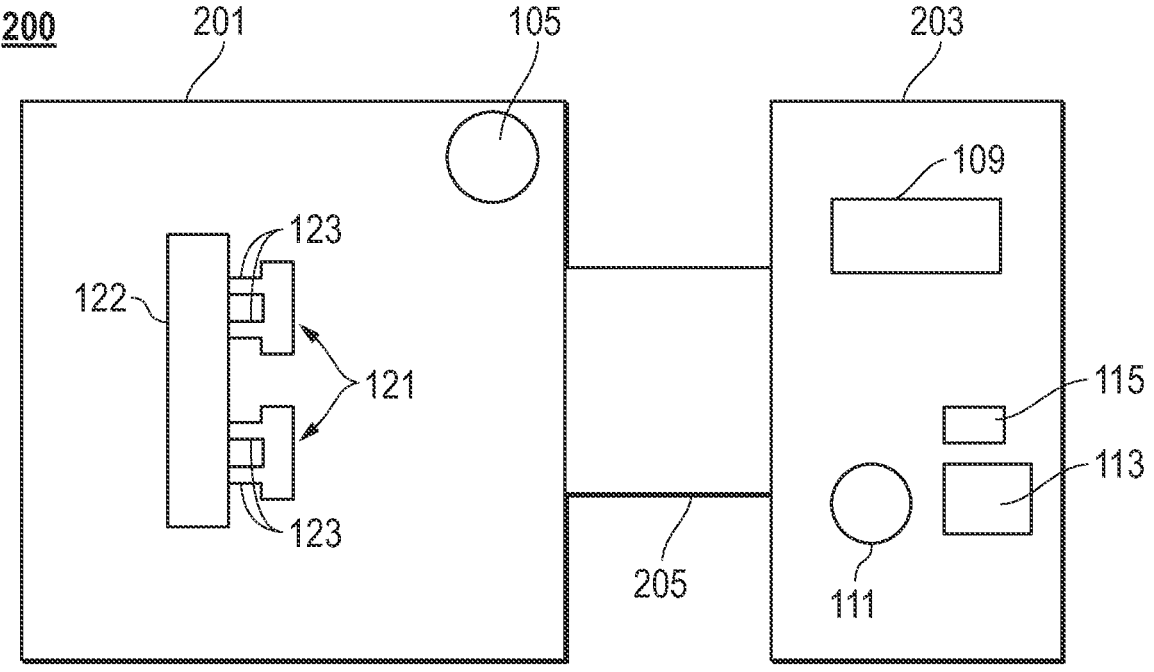
FIG. 2 includes a schematic view of a system according to one embodiment.

FIG. 2 illustrates a system 200 according to another embodiment. As illustrated, in certain non-limiting embodiments, the additive manufacturing housing 201 and finishing housing 203 can be separate housings, such that the components are not integrated into a single unit, as illustrated in the embodiment of FIG. 1. The system 200, may optionally include at least one transfer mechanism 205 configured to transfer at least a portion of the additive manufactured product from the additive manufacturing housing 201 to the finishing housing 203. The transfer mechanism 205 may include a conveyance system. One or more end effectors (e.g., 105 and/or 111) can work with the transfer mechanism 205 to support automated movement of the additive manufactured component between the additive manufacturing housing 201 and the finishing housing 203. The additive manufacturing housing 201 can include some or all of the components noted in other embodiments herein. The finishing housing 203 can include one or more components noted in other embodiments herein.

While not illustrated in FIG. 2, the system 200 can include at least one computing device for controlling aspects of the additive manufacturing process, transfer process, and/or finishing process. In certain instances, the additive manufacturing housing 201 can include a computing device configured to control operations of the additive manufacturing process and optionally the transfer process including movement of the additive manufactured component from the housing 201 to the housing 203. In another embodiment, the finishing housing 203 may include at least one computing device configured to control the operations of the finishing operations and optionally the transfer process.

Figure 3:
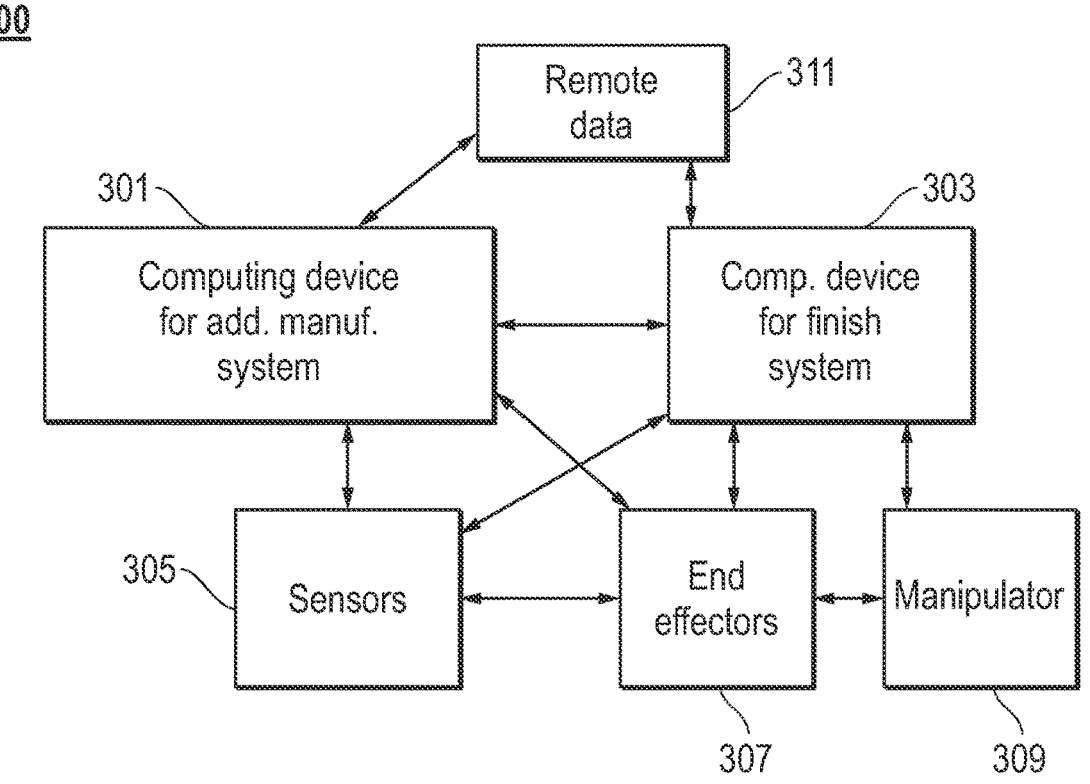
FIG. 3 includes a schematic including elements of the system and the interaction of the elements according to one embodiment.

FIG. 3 includes a schematic including elements of the system and the interaction of the elements according to one embodiment. In the non-limiting embodiment of FIG. 3, the system 300 can include a computing device 301 associated with the additive manufacturing system and a computing device 303 associated with the finishing system. As noted here, in other embodiments, the system 300 may optionally use a single computing system for both the additive manufacturing system and the finishing system. The computing devices 301 and 303 can be configured to send and receive information (i.e., communicatively coupled) with remote data 311. Remote data 311 can include data that is not physically located at the same place as the system 300, which may include for example, data stored in a remote location, which may be accessed through wired or wireless communication protocols. In one particular embodiment, the remote data 311 can represent cloud storage data.

The one or more computing devices 301 and 303 can be communicatively coupled with one or more components of the additive manufacturing system and/or finishing system, including for example, one or more sensors (305), one or more end effectors (307), and one or more manipulators (309).

The one or more computing devices 301 and 303 can include hardware or software. Some non-limiting examples of hardware can include a memory, a processor, input/output devices, a display, a keyboard, transmitters, receivers, and antennas, or any combination thereof.

Any of the computing devices of the embodiments herein may include a machine learning platform, which may use one or more sources of data (e.g., sensor data, part data, historical data, customer data, environmental data, data related to the types of fixed abrasives available, the wear status of one or more fixed abrasive articles, performance data, or any combination thereof) to create a trained platform that can create a model for conducting the finishing process or additive manufacturing process and/or provide real-time adaptations to the finishing process or additive manufacturing process. In one non-limiting embodiment, the machine learning platform may utilize one or more algorithms capable of reviewing historical data, comparing the historical data to the present conditions of the object for finishing and creating one or more models for conducting the finishing process or additive manufacturing process and/or provide real-time adaptations to the finishing process or additive manufacturing process. In at least one embodiment, the machine learning platform can be a predictive tool, which can compute certain criteria (e.g., time to completion, etc.) that may be helpful to a user. Additionally, in another embodiment, the machine learning platform may provide a plurality of models to a user, which may include a preferred or suggested model. In still another embodiment, the machine learning platform may have autonomous capabilities to conduct one or more finishing operations according to preferred conditions unless specified otherwise by a user.

The one or more computing devices 301 and 303 can further include software or firmware. In one embodiment, the software or firmware can be configured to generate one or more deterministic processes based on at least one of part data, historical data, data related to the types of fixed abrasives available, the wear status of one or more fixed abrasive articles, environmental data, sensor data, performance data, or any combination thereof.

In one aspect, the one or more deterministic processes can include one or more models. In certain instance, the one or more models can be sent to a display or other interface and presented in a user-readable medium. In another aspect, the one or more deterministic processes can include one or more models, wherein the one or more models may be configured to be sent as machine-readable medium to a controller of the one or more end effectors.

In a particular aspect, the computing device can include a processor configured to store or receive at least one of part data, historical data, data related to the types of fixed abrasives available, the wear status of one or more fixed abrasive articles, environmental data, sensor data, performance data, deterministic process data, or any combination thereof.

Figure 4:
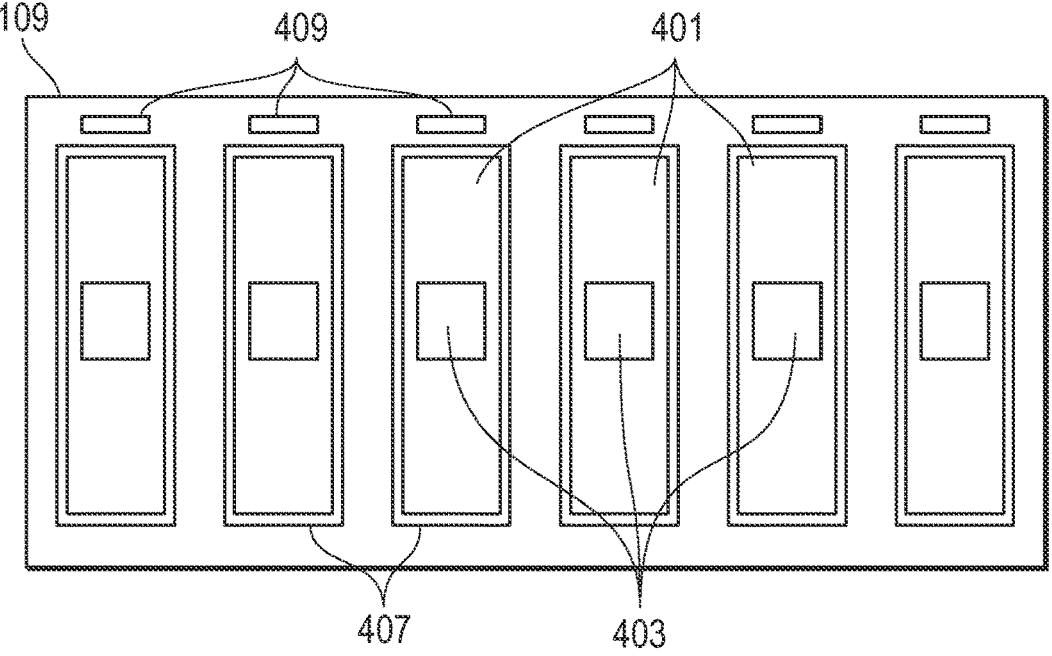
FIG. 4 includes a magazine according to one embodiment.

FIG. 4 includes an illustration of a magazine 109 according to one embodiment. According to one embodiment, the magazine 109 can include a plurality of abrasive articles 401. One or more of the abrasive articles of the plurality of abrasive articles 401 can differ from each other based on at least one product characteristic selected from the group consisting of thickness of the body, diameter of the body, shape of the body, type of abrasive, size of abrasive, content of abrasive, core material, buckling factor, bond material, content of bond material, porosity content, pore size distribution, construction of the abrasive section relative to the core, shape of the peripheral edge of the body (e.g., peripheral edge angle), or any combination thereof. In one particular embodiment, at least two of the abrasive articles of the plurality of abrasive articles have at least one product characteristic that is different compared to each other. In another aspect, the magazine 109 may include a plurality of the same type of fixed abrasive articles.

In one embodiment, the plurality of abrasive articles 401 may be positioned in holders 407. The holders 407 may be sized and shaped to hold one or more of the plurality of abrasive articles 401 to facilitate engagement with the end effector 111. For example, in one embodiment, at least one abrasive article is contained in the holder 407 such that the end effector can engage and operably couple to the abrasive article while it is fixed in a position in the holder 407. According to one embodiment, the fixed abrasive article 401 can be contained in the holder 407 of the magazine 109 in a manner configured to limit rotational motion of the fixed abrasive article 401 while an end effector 111 engages the fixed abrasive article via a threaded connection. After suitable coupling the end effector 111 with the fixed abrasive article 401, it can be moved in a particular manner, which may include movement in a single axis or multiple axes simultaneously in a release motion to release the abrasive article from the holder 407. According to a non-limiting embodiment, each holder 407 may be sized and shaped to hold only one particular type of abrasive article of the plurality of abrasive articles 401.

In another aspect, one or more of the abrasive articles can include one or more unique indicia (herein "indicia" can refer to a singular marking such as an indicium or a plurality of markings) 403. In one non-limiting embodiment, each of the abrasive articles can include a unique indicia providing information related to at least one product characteristic of the abrasive article. Suitable examples of product characteristics can include thickness of the body, diameter of the body, shape of the body, type of abrasive, size of abrasive, content of abrasive, core material, buckling factor, bond material, content of bond material, porosity content, pore size distribution, construction of the abrasive section relative to the core, shape of the peripheral edge of the body (e.g., peripheral edge angle), or any combination thereof.

In at least one embodiment, the unique indicia 403 may be placed on the abrasive articles to facilitate detection of wear or other status changes. For example, portions of the indicia may be worn away, allowing one or more sensors to detect the change in the indicia over time. One or more computing devices may be sent data on the change in the unique indicia 403 and assign a wear status to the abrasive article 401. The computing device may take wear status data into account when creating the deterministic process and may also facilitate replacement or repair of the abrasive article 401.

According to one embodiment, the magazine 109 may further include position indicia 409 associated with one or more positions in the magazine 109, which may also be associated with one or more holders 407. In one embodiment, the position indicia 409 may be associated with the unique indicia 403 of one or more abrasive articles 401. In one particular embodiment, each position indicia 409 may be the same as one unique indicia associated with an abrasive article 401. The position indicia 409 may provide a marking system to facilitate the proper placement of the abrasive articles 401 within their corresponding holders 407.

Suitable examples of unique indicia can include a marking, a number, a letter combination, a barcode, a matrix barcode, a color, a pattern, an etching or surface variation feature, and electronic device, or a combination thereof.

In another aspect, one or more abrasive articles 401 can include an electronic device, which may include information for use as unique indicia for each given abrasive article 401. In a particular aspect, the electronic device can include a wireless communication device including a logic element and an antenna. In one non-limiting embodiment, the electronic device can include at least one of a passive radio frequency identification (RFID) tag, an active radio frequency identification (RFID) tag, a sensor, a passive near-field communication device (passive NFC), an active near-field communication device (active NFC), an integrated circuit, a memory, a processor, or any combination thereof.

In a certain embodiment, the unique indicia can be in the form of a machine-readable medium. In one particular embodiment, the system may further comprise at least one sensor configured to read the machine-readable medium and configured to send the unique indicia to a computing device to confirm the type of abrasive article 401 engaged with the end effector 111. In one embodiment, the sensor can be an optical sensor.

In one embodiment, one or more sensors can be contained in the one or more end effectors 105 and 111. Non-limiting examples of the one or more sensors can be a thermal sensor, a force sensor, a proximity sensor, a vibration sensor, an acoustic sensor, a power sensor, an accelerometer, or any combination thereof. It will be appreciated that the end effector can be controlled based upon force-control or position control systems as known to those of skill in the art. In one embodiment, the end effector 105 and/or 111 can include at least one force sensor communicatively coupled to one or more controllers. In one non-limiting embodiment, the end effector 105 and/or 111 can include two or more force sensors, wherein each of the force sensors are measuring forces for different operations (e.g., a force sensor for a separation process and a force sensor for a surface finishing operation), which may be particularly suitable for operations conducting multiple types of material removal operations simultaneously, which are described in the embodiments herein.

In one aspect, the end effector 105 and/or 111 can include a force sensor can have at least one degree of freedom, such as at least two degrees of freedom, at least three degrees of freedom, at least four degrees of freedom, at least five degrees of freedom or even at least six degrees of freedom. Any one of the sensors in the end effectors 105 and/or 111 or any other sensors in the systems of the embodiments herein can send sensor data to one or more computing devices, which may be configured to receive the sensor data, compare the sensor data to a finishing model and/or a processor configured to control the deterministic process. In non-limiting embodiments, the processor can send control signals to the end effector to control the finishing process, including for example, but not limited to the movement and/or orientation of the first part 121, second part 122, joint region 123, and/or fixed abrasive article 401.

The present disclosure is further directed to one or more methods for conducting material removal operations for parts created through an additive manufacturing process. In one aspect, the method can include providing a fixed abrasive article and separating a first part from a second part using a fixed abrasive article, wherein the fixed abrasive article can be operated according to a deterministic process.

In one embodiment, providing the fixed abrasive article can include selecting a fixed abrasive article 401 from the magazine 109. In another embodiment, providing the fixed abrasive article 401 can include selecting a fixed abrasive article 401 via an end effector (e.g., end effector 111) and having the end effector 111 operatively coupled to the fixed abrasive article 401 such that it can be used in a material removal operation. Prior to selecting a fixed abrasive article 401, the computing device may receive one or more signals regarding a wear status of the fixed abrasive article 401. The wear status of one or more fixed abrasive articles 401 in the magazine 109 may determine which fixed abrasive articles are selected for use during the material removal operation. Further, the size of a second part 122 such as a build plate, the size, position and number of joint regions 123 on the second, and the size position and number of first parts may determine which abrasive articles are selected for use during the material removal operation. For example, large build plates with joint regions 123 and first parts 121 located a distance from the edge of the build plate may require larger abrasives to the reach joint regions 123 and first parts 121. Further, the ability of the finishing system to rotate a second part 122 such as a build plate during the finishing process may determine which fixed abrasive articles are selected for use during the material removal operation. In another non-limiting embodiment, selecting a fixed abrasive article 401 can include confirming the type of abrasive article selected and/or operatively coupled to the end effector 111 by reading a unique indicia 403 associated with the fixed abrasive article 401.

After providing the fixed abrasive article, the process may further include separating the first part 121 from the second part 122 at the joint region 123. As noted in other embodiments herein, other additive manufacturing processes may not necessarily create a joint region 123 and may simply require finishing or refurbishing of one or more surface portions, for which the present system and process may still be used. The deterministic process can include a finishing model configured to control the material removal operation. In one embodiment, the model may control one or more aspects of the material removal operation, including for example, but not limited to, selection of the type of abrasive article, movement of the abrasive article 401, movement of the first part 121, second part 122, and/or joint region 123 relative to the abrasive article 401, material removal parameters (e.g., G-ratio, average normalized kerf, material removal rate, specific grinding energy, infeed rate, rpms of the abrasive article 401, spindle motor power, etc.). In at least one embodiment, the finishing model can be created based upon at least one of part data, historical data, data related to the types of fixed abrasives available, the wear status of one or more fixed abrasive articles, environmental data, sensor data, performance data, or any combination thereof. As noted herein, one or more finishing models may be generated by the computing device, and the one or more finishing models can be presented to a user via at least one user interface for selection of the most suitable model by the user. Additionally, in one alternative embodiment, the model can be updated in real-time by sensor data, environmental data, wear status data, and/or performance data, such that the material removal process is adapted in real-time.

In one particular embodiment, the separating process can include real-time measurement of the separating process by one or more sensors, including for example, but not limited to a force sensor, optical sensor, or any combination thereof. The sensors can send sensor data to one or more computing devices. Thus, the separating process can include the creation of progress data, which may be sent to one or more computing devices, which can compare the progress data to other data or the model. Depending upon the comparison, the computing device may change one or more process parameters to adapt the separation process based on the progress data. One or more process parameters may include, but it not limited to, at least one of orientation of the first part 121 relative to the second part 122, the position of one or more end effectors (105 or 111) engaged with the first part 121 and/or the second part 122, the position of a manipulator in contact with the first part 121 and/or second part 122, or a combination thereof. In one particular embodiment, the progress data can be used to control the release of the first part 121 from the second part 122.

According to one embodiment, the process for separating can first include receiving part data. At least one computing device associated with the finishing operations can receive part data related to the first part 121, second portion 123, and/or joint region. Non-limiting examples of part data can include information related to an orientation of the first part relative to the joint region and/or the second part, a size of the first part, a shape of the first part, a composition of the first part, an orientation of the second part relative to the first part and/or joint region, a size of the second part, a shape of the second part, a composition of the second part, an orientation of at least one joint region between the first part and second part, a size (e.g., width and/or height) of at least one joint region between the first part and second part, a shape of at least one joint region between the first part and the second part, a composition of at least one joint region between the first part and the second part, markings or surface features of the joint region, or any combination thereof. In one aspect, the part data can be used to create the deterministic process, including the finishing model used to control the material removal operations and finish the first part to the desired tolerances. It will also be appreciated that historical data may be used and compared to the part data to create the finishing model. In still another embodiment, a machine learning platform that is part of the one or more computing devices may use the part data to create one or more finishing models. The machine learning platform may also measure and compare the finishing operation of the first part to historical data, which may include historical part data for similar or the same parts, and alter the model and/or adapt the model in real-time to improve the finishing operation.

In another embodiment, the deterministic process includes a finishing model configured to control a path of motion of at least one of the first part 121 or the second part 122 relative to one or more fixed abrasive articles 401. For example, in one embodiment, the deterministic process includes moving the fixed abrasive article 401 relative to a stationary position of at least one of the first part 121 or the second part 122. It will be appreciated that more than one fixed abrasive article 401 can be used simultaneously for removing material from the first part 121, second part 122 and/or joint regions 123. In still another embodiment, the deterministic process includes moving at least one of the first part 121 and/or second part 122 relative to a stationary position of the fixed abrasive article 401. In certain optional embodiments, moving at least one of the first part 121 and/or second part 122 may include engaging at least one of the first part 121 and/or second part 122 with an end effector 105 and/or 111 configured to manipulate the first part 121 and/or second part 122 relative to the fixed abrasive article 401. In still another embodiment, the deterministic process may include independently moving the first part 121 and/or second part 122 while simultaneously and independently moving the fixed abrasive article 401.

According to one embodiment, the additive manufacturing process can include receiving data from the finishing system. At least one computing device associated with the additive manufacturing system can receive historical data, data related to the types of fixed abrasives available, the wear status of one or more fixed abrasive articles, environmental data, sensor data, performance data, or any combination thereof. In one aspect, the data received can be used to determine aspects of the additive manufacturing process such as an orientation of the first part relative to the joint region and/or the second part, a size of the first part, a shape of the first part, a composition of the first part, an orientation of the second part relative to the first part and/or joint region, a size of the second part, a shape of the second part, a composition of the second part, an orientation of at least one joint region between the first part and second part, a size (e.g., width and/or height) of at least one joint region between the first part and second part, a shape of at least one joint region between the first part and the second part, a composition of at least one joint region between the first part and the second part, markings or surface features of the joint region, or any combination thereof. For example, the additive manufacturing process may require a smaller build plate, or require the joint regions and first parts placed closer to the edge of the build plate if only small abrasives are available. Further, the size of joint regions can be minimized depending on the size of abrasives available so as to reduce material waste. Ideally, the process that results in the desired parts with the minimal amount of material wasted due to large joint regions, build plates, or kerf loss while maintaining the desired quality will be selected. It will also be appreciated that historical data may be used and compared to the abrasive wear status and availability data to determine aspects of the additive manufacturing process. In still another embodiment, a machine learning platform that is part of the one or more computing devices may use the part data to create one or more finishing models. The machine learning platform may also measure and compare the finishing operation of the first part to historical data, which may include historical part data for similar or the same parts, and alter the model and/or adapt the model in real-time to improve the finishing operation.

Figure 6:
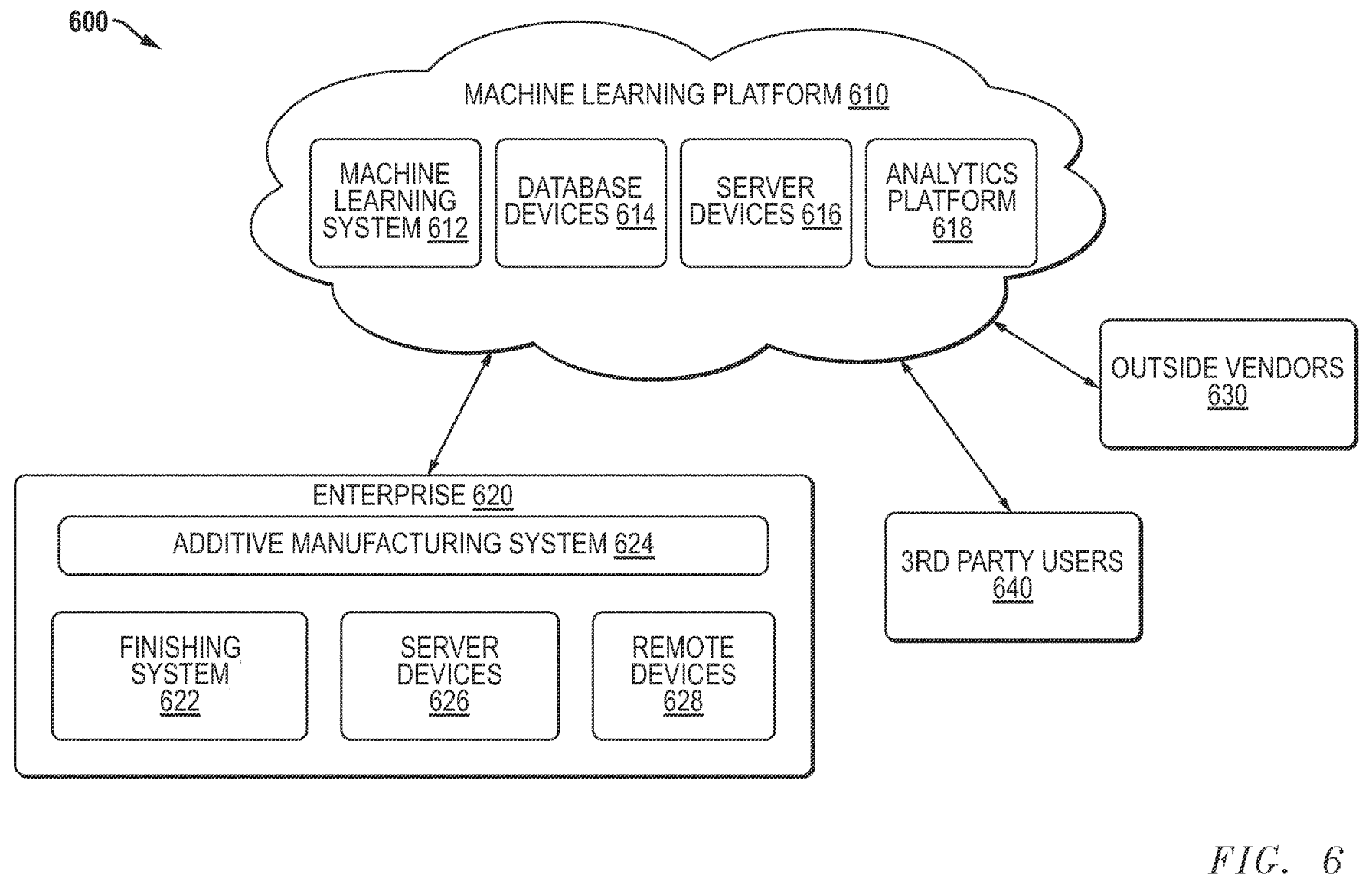

FIG. 6 illustrates arrangement 600 of machine learning platform 610, according to an example embodiment. As shown in FIG. 6, machine learning platform 610 may be communicatively coupled to enterprise 620, outside vendors 630, and $3^{rd}$ party users 640. Machine learning platform 610 may include, for example, machine learning system 612, database devices 614, server devices 616, and analytics platform 618. Machine learning platform 610 may utilize machine learning to process and/or analyze the sensor data collected by the enterprise 620. Machine learning platform 610 may store the received sensor data and then analyze the data to provide information related to the finishing system 622, additive manufacturing process 624, abrasive-specific information associated with the fixed abrasive articles of the finishing system 622, workpiece-specific information associated with the bodies produced by the additive manufacturing process 624 and finishing system 622, the types of fixed abrasives available, the wear status of one or more fixed abrasive articles, environmental data, sensor data, performance data, or any combination thereof. As used herein, product-specific information may refer to any information related to elements of an abrasive product/device or elements of any abrasive operations/processes performed by the finishing system. For example, machine learning platform 610 may determine best operational practices for enterprise 620, such as ideal build conditions and specifications for the additive manufacturing process 624 or abrasive production selection and operation for the finishing system 622. In another example, the machine learning platform 610 may determine different value metrics (e.g., productivity, product life, etc.) for different fixed abrasive articles or additive manufacturing products.

Machine learning system 612 may include one or more machine learning models configured to receive sensor data from enterprise 620. For example, sensor data may be related to the additive manufacturing process, the finishing system, a particular workpiece, a particular fixed abrasive article, or a particular grinding condition from enterprise 620. In response to receiving the sensor data, machine learning system 612 may train the one or more machine learning models to predict abrasive-specific information and/or workpiece specific information related to the received sensor data. After one or more machine learning models have been trained, the machine learning system 612 may be applied at run-time to predict or infer a prediction condition based on the real-time data received from enterprise 620. As described herein, the predicted condition could trigger, prompt, or initiate various events such as a notification, a report, an order, or another type of action.

Database devices 614 may include one or more computing devices configured to store data into one or more databases. For example, database devices may include one or more relational databases (e.g., SQL), graph databases (e.g., neo4j), document databases (e.g., MongoDB), column databases (e.g., Cassandra), and/or other database models. Database devices 614 may act as data storage for components of machine learning platform 610. An as example, database devices 614 may be configured to receive and store sensor data from enterprise 620 and provide the sensor data to machine learning system 612 for training one or more machine learning models. In some examples, database devices 614 may be configured to act as the primary data source for analytics platform 618. In other examples, database devices 614 may be configured to store one or more trained models (e.g., learned parameters).

Server devices 616 may include one or more web servers, file servers, and/or computational servers. Server devices may facilitate communication between machine learning platform 610 and enterprise 620, outside vendors 630, and $3^{rd}$ party users 640. Communication may be facilitated by known web communication protocols, such as TCP/IP. In some embodiments, server devices 616 may be utilized by machine learning system 612 or analytics platform 618 for computational tasks. For example, devices in server devices 616 may be part of a MapReduce cluster that is used as part of a distributed training architecture for machine learning system 612.

Analytics platform 618 may include a web application configured to utilize information collected from machine learning system 612 and database devices 616. After processing the collected information, analytics platform 618 could generate various predicted future conditions for enterprise 620 as well as various prescriptive actions for enterprise 620. As used herein, a predicted future condition refers to an estimate about a future event that could occur at enterprise 620. Examples of future events may include a predicted failure of an abrasive article/workpiece, a prediction of potential damage to an abrasive article/workpiece, or a prediction that the quality of a workpiece does not meet a predetermined quality level, among other possibilities. Further, as used herein, a prescriptive action refers a recommendation of a best course of action given a current state and/or current situation of an abrasive article and/or given a current state and/or current situation of enterprise 620. Examples of prescriptive actions may include a command to cease use of an abrasive article if the abrasive article is displaying aberrant behavior, a command to adapt the speed rate of an abrasive wheel, a notification to change an abrasive article of an abrasive product, or a notification to dress a damaged abrasive product, among other possibilities.

In some embodiments, analytics platform 618 includes a simulation environment programmed with digital versions (e.g., "digital twins") of the additive manufacturing system 624 and finishing system 622 of enterprise 620. The simulation environment could use these digital versions to estimate productivity, costs, and/or injuries resulting from adding/reconfiguring/removing different digital abrasive products from the stimulation environment. In some embodiments, analytics platform 618 is configured to graphically display metrics associated with the additive manufacturing system 624 and finishing system 622. More details on analytics platform 618 are provided below.

Notably, the configuration of machine learning platform 610 is provided as an example. In some cases, machine learning platform 610 may include one or more additional devices. For example, machine learning platform 610 may include a firewall to allow access from authorized users, deny access from unauthorized users, provide intrusion detection, facilitate virus scanning, and/or provide other network security services. As another example, machine learning platform 610 may include one or more load balancers to distribute incoming network traffic or requests across multiple computing devices within machine learning platform 610 (e.g., such that no single devices is overwhelmed with task requests). In other examples, machine learning platform 610 may include one or more routers, virtual machines, proxy servers, and/or other common network devices. Machine learning platform 610 may also be connected to one more client devices (e.g., personal computers or mobile phones). In some examples, machine learning platform 610 may offer virtual private network (VPN) services.

Additionally and/or alternatively, components of machine learning platform 610 may be replicated across multiple computing devices to provide data duplication and increase capacity of services. These computing devices may be located at different physical locations to ensure high availability in case of failure at one location. As such, machine learning platform 610 may be configured across different physical locations and hundreds of computing devices.

Enterprise 620 may include, for example, one or more additive manufacturing systems 624 and finishing systems 622, server devices 626, and remote devices 628. Enterprise 620 may represent a single geographic location containing multiple abrasive machines or may represent multiple abrasive machines located across several geographic locations. Moreover, enterprise 620 may represent a single enterprise of a plurality of enterprises that utilize products manufactured or maintained by the entity operating machine learning platform 610. As such, machine learning platform 610 may act as a remote customer support system for these products.

Finishing systems 622 may include finishing systems or assemblies described elsewhere in this application such as finishing systems designed to finish parts produced by additive manufacturing. As described above, finishing systems 622 may be manufactured or maintained by the entity operating machine learning platform 610. Finishing systems 622 may contain one or more sensors that collect abrasion operational data associated with grinding operations or the involving the workpiece being grinded on. For example, the one or more sensors may transmit the collected abrasion operational data, via Bluetooth, TCP/IP or other networking protocols, to server devices 626. In another example, the one or more sensors may transmit the collected abrasion operational data to machine learning platform 610.

Additive manufacturing systems 624 may include one or more devices or systems that manufacture the parts or bodies made by additive manufacturing described elsewhere in this application.

Server devices 626 may include one or more computing devices located on enterprise 620. Server devices may be configured to receive and aggregate sensor data from abrasive products 622 and wearable devices 624. Server devices 626 may be operated by machine learning platform 610 or by enterprise 620. Upon receiving sensor data, server devices 626 may apply data filters to the sensor data, such as removing outlier sensor data and/or ignoring sensor data from one or more wearable devices 624 or abrasive products 622. In some examples, server devices 626 may be configured to convert sensor data into a different data format more suitable for machine learning platform 610, for example into JavaScript Object Notation (JSON). As another example, server devices 626 may allow a human operator to tag sensor data with labels, as further described herein. Server devices 626 may receive product-specific information and/or work-piece-specific information from machine learning platform 610 and distribute this information to remote devices 628, abrasive products 622, wearable devices 624, or may store this data for later access by members of enterprise 620.

In some embodiments, server devices 626 may provide sensor data to machine learning platform 610 by grouping data in batches. Batches may be transmitted periodically, for example, every 10 minutes or 30 minutes. In other examples, server devices 626 may send sensor data machine learning platform 610 in a real time, streaming format. In some embodiments, server devices 626 may be configured to monitor the sensors disposed in abrasive products 622 and wearable devices 624. For example, server devices 626 may send heartbeat messages to the sensors, which in turn may be configured to respond with a response heartbeat message. This may ensure that sensors are operable and have not stopped sending data to server devices 626, for example, because of malfunction or loss of power.

Remote devices 628 may include interfaces located on one or more computing devices in enterprise 620. For example, remote devices 628 may include on wearable devices (e.g., smart watches), mobile devices (e.g., mobile phones or tablets), and/or monitors (e.g., computer screens). Remote devices 628 may receive data from server devices 626 or machine learning platform 610 and display output data on a graphical user interface (GUI) or emit an alarm, an alert, a notification, a report, an order, and/or another type of action.

Outside vendors 630 may represent one or more comput-ing systems managed by partners of the entity operating machine learning platform 610. In example embodiments, machine learning platform 610 may transmit to outside vendors 630 new order requests, delivery requests, and/or other logistics requests based on predictions made by machine learning system 612. These requests may be made automatically by machine learning platform 610 on the behalf of enterprise 620.

$3^{rd}$ party users 640 may include one or more individuals or organizations that utilize the capabilities of analytics platform 618. For example, $3^{rd}$ party users 640 may access analytics platform 618 via a web browser and may be able to access data provided to analytics platform 618 by machine learning platform 610. $3^{rd}$ party users 640 may be granted access, for example, through a subscription based model. Analytics platform 618 may provide multiple levels of access to $3^{rd}$ party users 640, each based on the subscrip-tion purchased by $3^{rd}$ party users 640. For example, each level of access may provide more sensitive or larger amounts of data.

Notably, the components of arrangement 600 are used for the purpose of example. Other components and arrange-ments are possible.

Figure 5A:
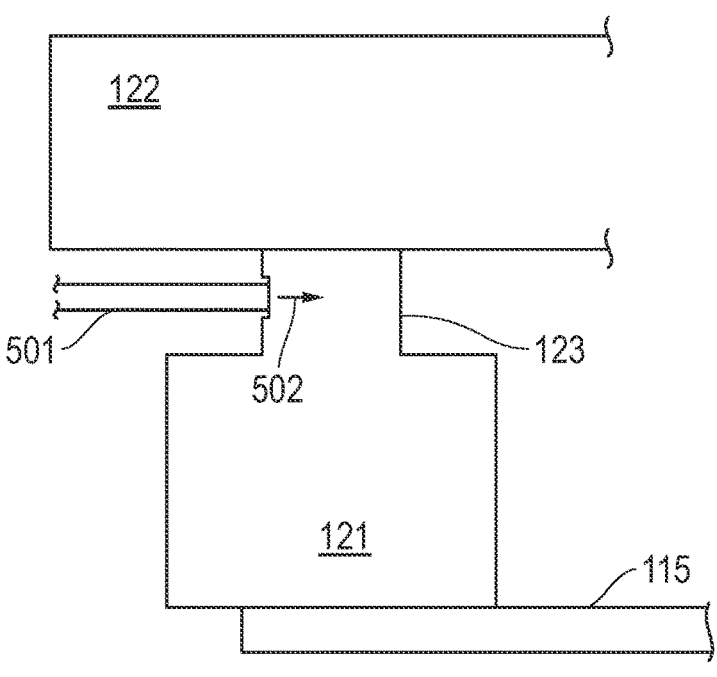
FIGS. 5A-5E include illustrations of systems for conducting finishing processes according to embodiments herein.

FIGS. 5A-5E include illustrations of systems and methods for conducting various alternative finishing processes according to embodiments herein. FIG. 5A includes an illustration of a first part 121, a second part 122, and a joint region 123 disposed between and joining the first part 121 to the second part 122. The embodiment of FIG. 5A also includes a fixed abrasive article 501 configured to conduct a finishing operation by sectioning through a width of the joint region 123 (e.g., in direction of 502) to separate the first part

121 from the second part 122. In one particular embodiment, FIG. 5A may represent a single-pass cutting operation. Single-pass refers to the motion of the fixed abrasive article 501 relative to the joint region 123, such that the fixed abrasive article 501 (or the body including the first part 121, second part 122 and joint region 123) can be moved relative to each other in a single direction and facilitate sectioning through the joint region 123 and separating the first part 121 from the second portions 122. As described herein, the embodiment of FIG. 5A also includes a manipulator 115 configured to engage at least a portion of the first part 121 during the finishing operation, such that upon completion of sectioning, the manipulator can support the weight of the first part 121 and avoid damage of the first part 121.

It will be appreciated that after sectioning of the joint region 123, other processes may be conducted on the remaining portions of the joint region 123 attached to the first part 121 and second part 122. For example, in one embodiment, on or more surface of the first part 121 and/or second part 122 may be polished to remove any remaining portions of the joint region 123 from the first part 121 and/or second part 122. For example, in one non-limiting embodi-ment, the process can include a single-pass cutting operation and a single-pass surface surface-modification operation conducted separately from each other.

Figure 5B:
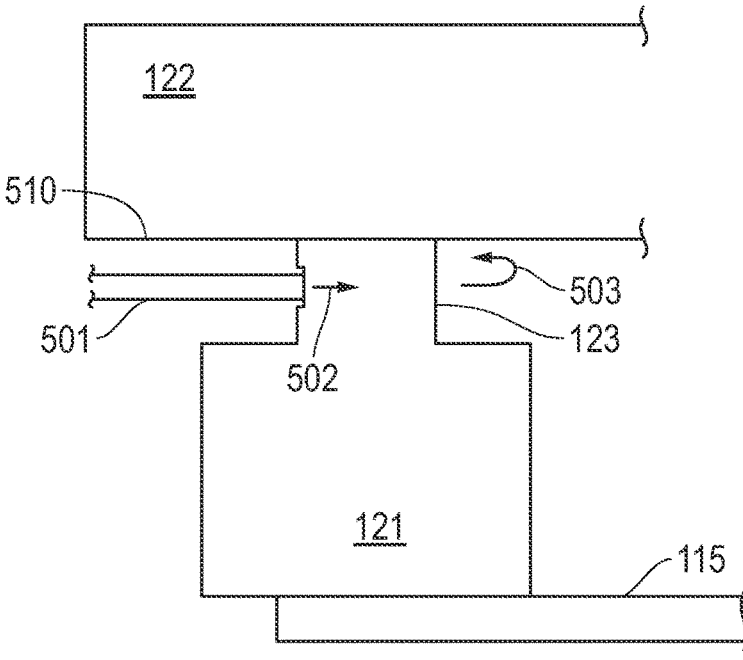
Figure 5C:
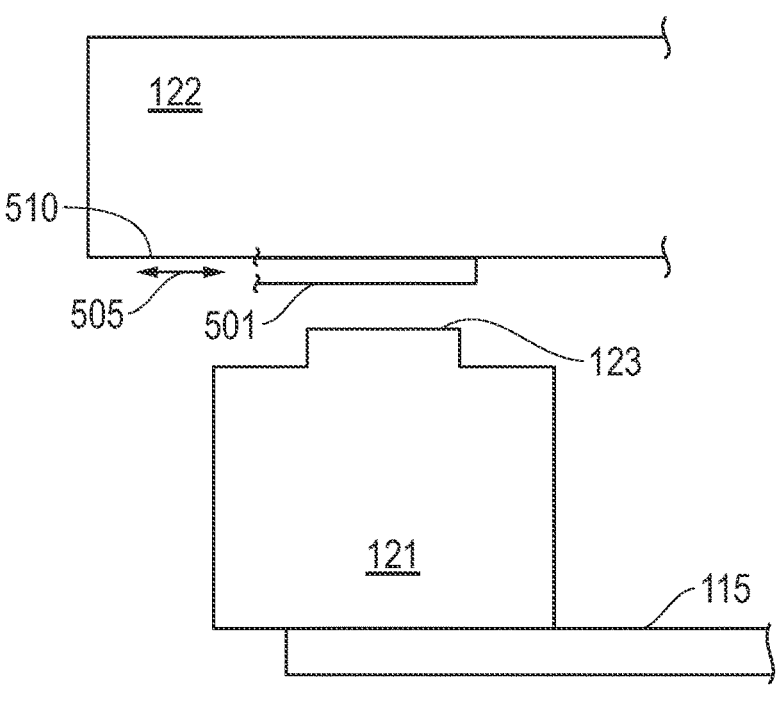

FIGS. 5B and 5C include illustrations of a first part 121, a second part 122, and a joint region 123 disposed between and joining the first part 121 to the second part 122. The embodiments of FIGS. 5B and 5C also include a fixed abrasive article 501 configured to conduct a finishing opera-tion. The embodiments also include a manipulator 115 that may be used to support the first part 121 during finishing. In one particular embodiment, the fixed abrasive article 501 may be operated in a multi-pass method, which includes more than one path through the same region to conduct sectioning and surface finishing. For example, in one non-limiting embodiment, the fixed abrasive article 501 can move in direction 502 to conduct sectioning through a width of the joint region 123 to separate the first part 121 from the second part 122. It will be understood that in other embodi-ments, the fixed abrasive article 501 can be stationary and the first part 121, second part 122, and joint region 123 can be moved relative to the stationary fixed abrasive article 501 to complete sectioning.

After conducting the sectioning, the fixed abrasive article 501 and/or second portion 122 may be moved relative to each other (e.g., in the direction 503 of FIG. 5B or the direction 505 of FIG. 5C) to facilitate removing excess material from the surface 510 of the second part 122. In some instances, it may be advantageous to remove excess material from the surface 510, such as in a surface-modifi-cation operation, to suitably prepare the surface 510 of the second part 122 for subsequent additive manufacturing operations. In one embodiment, the second part 122 can be a build plate, which may need to have a particular surface quality to be suitable for use as a build plate.

In one embodiment, the process of finishing the surface 510 may include multiple passes in multiple directions (e.g., back-and-forth) to facilitate finishing the surface 510 to the desired quality. According to one aspect, the single-pass cutting may be conducted along a different path direction as compared to the single-pass surface-modification operation.

In still another embodiment, the fixed abrasive article 501 used to conduct the sectioning (e.g., FIG. 5B) can be different from the fixed abrasive article 501 used to conduct surface finishing (e.g., FIG. 5C). In still another embodiment, sectioning and surface finishing may use the same fixed abrasive article 501.

In one particular embodiment, FIG. 5A may represent a single-pass cutting operation. Single-pass refers to the motion of the fixed abrasive article 501 relative to the joint region 123, such that the fixed abrasive article 501 (or the body including the first part 121, second part 122 and joint region 123) can be moved relative to each other in a single direction and facilitate sectioning through the joint region 123 and separating the first part 121 from the second portions 122.

Figure 5D:
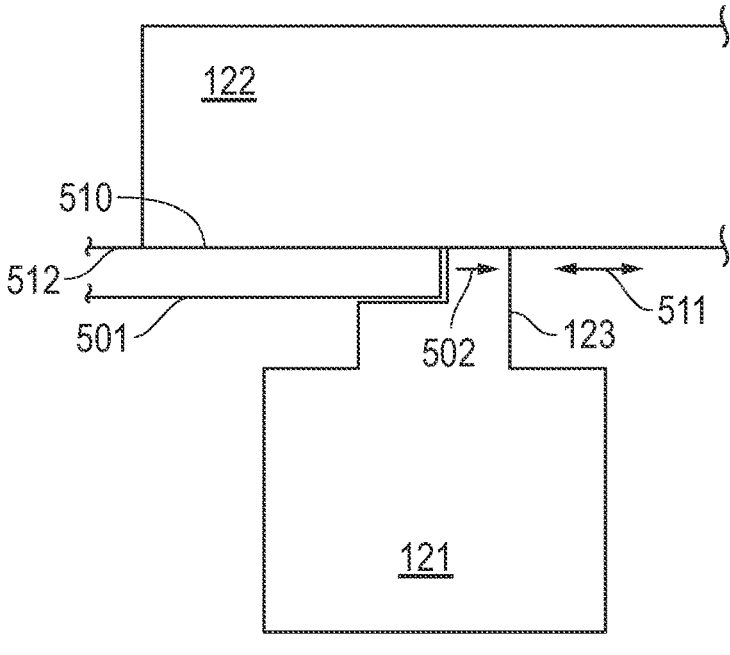

FIG. 5D includes an illustration of a first part 121, a second part 122, and a joint region 123 disposed between and joining the first part 121 to the second part 122. The embodiment of FIG. 5D also includes a fixed abrasive article 501 configured to conduct a finishing operation by sectioning through a width of the joint region 123 (e.g., in direction of 502) to separate the first part 121 from the second part 122 (e.g., in direction 502). In the particular embodiment of FIG. 5D, the process includes a finishing operation including simultaneous sectioning and surface-modification. In such an operation, the fixed abrasive article 501 is simultaneously contacting and removing material from the joint region 123 and the surface 510 such that the first part 121 is effectively separated from the second part 122 and the surface 510 of the second part 122 is finished. In one embodiment, the finishing operation of FIG. 5D may be a single-pass sectioning and surface-modification operation (e.g., in the direction 502). In still other embodiments, the operation may be a multi-pass operation, wherein the first pass can include simultaneous sectioning and surface-modification (e.g., in direction 502), and subsequent movements (e.g., in direction 511) after completing the sectioning may be focused on surface-modification of the surface 510. While the orientation of the fixed abrasive article 501 is demonstrated as having a major surface 512 essentially co-planar with the surface 510, it will be appreciated that other orientations of the fixed abrasive article 501 relative to the surface 510 are possible. A manipulator is not depicted in FIG. 5D, but it will be appreciated that it may be used.

Figure 5E:
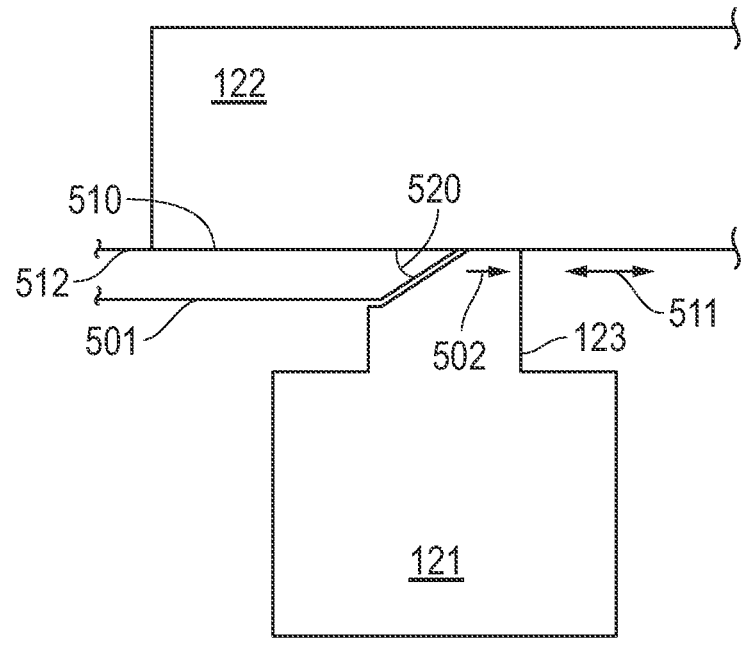

FIG. 5E includes an illustration of a first part 121, a second part 122, and a joint region 123 disposed between and joining the first part 121 to the second part 122. The embodiment of FIG. 5E also includes a fixed abrasive article 501 configured to conduct a finishing operation by sectioning through a width of the joint region 123 (e.g., in direction of 502) to separate the first part 121 from the second part 122 (e.g., in direction 502). Unlike the embodiment, of FIG. 5D, the fixed abrasive article 501 has a peripheral edge of a different shape, including a non-orthogonal peripheral edge angle 520. In the particular embodiment of FIG. 5E, the process includes a finishing operation including simultaneous sectioning and surface-modification. In some instances, the peripheral edge angle 520 may facilitate effective simultaneous sectioning and surface-modification. In such an operation, the fixed abrasive article 501 is simultaneously contacting and removing material from the joint region 123 and the surface 510 such that the first part 121 is effectively separated from the second part 122 and the surface 510 of the second part 122 is finished. In one embodiment, the finishing operation of FIG. 5E may be a single-pass sectioning and surface-modification operation (e.g., in the direction 502). In still other embodiments, the operation may be a multi-pass operation, wherein the first pass can include simultaneous sectioning and surface-modification (e.g., in direction 502), and subsequent movements (e.g., in direction 511) after completing the sectioning may be focused on surface-modification (e.g., grinding and/or polishing) of the surface 510. While the orientation of the fixed abrasive article 501 is demonstrated as having a major surface 512 essentially co-planar with the surface 510, it will be appreciated that other orientations of the fixed abrasive article 501 relative to the surface 510 are possible. A manipulator is not depicted in FIG. 5E, but it will be appreciated that it may be used.

In one embodiment, the separation process can be conducted at a particular average material removal rate that improves the process and resulting quality of the first and second parts 121 and 122. For example, the process can be conducted at an average material removal rate within a range of at least 1 $in^3$/min per inch (i.e., 1 $in^2$/min) and not greater than 10 $in^3$/min per inch (i.e., 10 $in^2$/min). In one non-limiting embodiment, the average material removal rate can be at least 1.5 $in^2$/min or at least 2 $in^2$/min or at least 2.5 $in^2$/min or at least 3 $in^2$/min or at least 3.5 $in^2$/min or at least 4 $in^2$/min or at least 4.5 $in^2$/min or at least 5 $in^2$/min or at least 5.5 $in^2$/min or at least 6 $in^2$/min or at least 6.5 $in^2$/min or at least 7 $in^2$/min or at least 7.5 $in^2$/min or at least 8 $in^2$/min or at least 8.5 $in^2$/min. In still another non-limiting embodiment, the average material removal rate can be not greater than 9.8 $in^2$/min, such as not greater than 9.5 $in^2$/min or not greater than 9 $in^2$/min or not greater than 8.5 $in^2$/min or not greater than 8 $in^2$/min or not greater than 7.5 $in^2$/min or not greater than 7 $in^2$/min or not greater than 6.5 $in^2$/min or not greater than 6 $in^2$/min or not greater than 5.5 $in^2$/min or not greater than 5 $in^2$/min or not greater than 4.5 $in^2$/min or not greater than 4 $in^2$/min or not greater than 3.5 $in^2$/min or not greater than 3 $in^2$/min or not greater than 2.5 $in^2$/min or not greater than 2 $in^2$/min. It will be appreciated that the average material removal rate can be within a range including any of the minimum and maximum values noted above, such as within a range of at least 1.5 $in^2$/min to not greater than 10 $in^2$/min or within a range of at least 2 $in^2$/min to not greater than 10 $in^2$/min or within a range of at least 3 $in^2$/min to not greater than 10 $in^2$/min or within a range of at least 5 $in^2$/min to not greater than 10 $in^2$/min.

In one embodiment, the separation process can be conducted at a particular average kerf that allows for smaller joint regions while maintaining finishing process efficiencies and the quality of the first and second parts 121 and 122. For example, in one embodiment, the average kerf can be within a range of at least 0.002 inches and not greater than 0.25 inches. In one non-limiting embodiment, the average kerf can be at least 0.003 inches, such as at least 0.005 inches or at least 0.008 inches or at least 0.01 inches or at least 0.03 inches or at least 0.05 inches or at least 0.08 inches or at least 0.1 inches or at least 0.15 inches or at least 0.18 inches or at least 0.2 inches. In still another non-limiting embodiment, the average kerf can be not greater than 0.25 inches or not greater than 0.22 inches or not greater than 0.2 inches or not greater than 0.18 inches or not greater than 0.15 inches or not greater than 0.13 inches or not greater than 0.1 inches or not greater than 0.08 inches or not greater than 0.05 inches or not greater than 0.03 inches or not greater than 0.01 inches or not greater than 0.008 inches or not greater than 0.005 inches. It will be appreciated that the average kerf can be within a range including any of the minimum and maximum values noted above, such as within a range of at least 0.002 inches to not greater than 0.2 inches or within a range of at least 0.003 inches to not greater than 0.15 or within a range of at least 0.005 inches to not greater than 0.1 inches or within a range of at least 0.005 inches to not greater than 0.08 inches.

As used herein, the average kerf is the average thickness of the channel formed between the two components during the separation process. In at least one embodiment, the average kerf may be measured at random intervals during the operation with one or more sensors and the values may be averaged to calculate the average kerf.

In another aspect, the separation process can be conducted at a particular average specific grinding energy that improves the process and resulting quality of the first and second parts 121 and 122. For example, the specific grinding energy may be at least 1 hp-min/in$^3$ and not greater than 40 hp-min/in$^3$. In one non-limiting embodiment, the specific grinding energy may be at least 2 hp-min/in$^3$, such as at least 3 hp-min/in$^3$ or at least 5 hp-min/in$^3$ or at least 8 hp-min/in$^3$ or at least 10 hp-min/in$^3$ or at least 12 hp-min/in$^3$ or at least 15 hp-min/in$^3$ or at least 18 hp-min/in$^3$ or at least 20 hp-min/in$^3$ or at least 23 hp-min/in$^3$ or at least 25 hp-min/in$^3$ or at least 28 hp-min/in$^3$ or at least 30 hp-min/in$^3$ or at least 33 hp-min/in$^3$ or at least 35 hp-min/in$^3$. Still, in another non-limiting embodiment, the average specific grinding energy may be not greater than 38 hp-min/in$^3$, such as not greater than 35 hp-min/in$^3$ or not greater than 33 hp-min/in$^3$ or not greater than 30 hp-min/in$^3$ or not greater than 28 hp-min/in$^3$ or not greater than 25 hp-min/in$^3$ or not greater than 23 hp-min/in$^3$ or not greater than 20 hp-min/in$^3$ or not greater than 18 hp-min/in$^3$ or not greater than 15 hp-min/in$^3$ or not greater than 13 hp-min/in$^3$ or not greater than 10 hp-min/in$^3$ or not greater than 8 hp-min/in$^3$ or not greater than 5 hp-min/in$^3$. It will be appreciated that the average specific grinding energy can be within a range including any of the minimum and maximum values noted above, such as within a range of at least 1 hp-min/in$^3$ to not greater than 38 hp-min/in$^3$ or within a range of at least 2 hp-min/in$^3$ to not greater than 30 hp-min/in$^3$ or within a range of at least 3 hp-min/in$^3$ to not greater than 25 hp-min/in$^3$. In one embodiment, the average specific grinding energy may be calculated from the power used to conduct the separation process.

The average specific grinding energy may be calculated as power divided by material removal rate (i.e., P/MRR). The average specific grinding energy can be calculated from a plurality of instantaneous specific grinding energy values calculated from a plurality of power measurements taken at different times during the separation process.

In another aspect, the sectioning process can be conducted at a particular G-ratio, which is a measure of the material removed from the workpiece divided by the material lost from the fixed abrasive article. The processes herein may be conducted at a particular G-ratio that may facilitate improved material removal operations and quality of the first and second parts 121 and 122. In one embodiment, the G-ratio may be at least 10, such as at least 20 or at least 50 or at least 100 or at least 200 or at least 300 or at least 400 or at least 500 or at least 600 or at least 700 or at least 800 or at least 900. In still another non-limiting embodiment, the G-ratio may be not greater than 1000, such as not greater than 900 or not greater than 800 or not greater than 700 or not greater than 600 or not greater than 500 or not greater than 400 or not greater than 300 or not greater than 200. It will be appreciated that the G-ratio may be within a range including any of the minimum and maximum values noted above.

The foregoing embodiments related to the average G-ratio, average material removal rate, average kerf, and average specific grinding energy are provided in the context of sectioning. However, it will be appreciated that for surface-modification operations conducted separately from the separation process, such surface-modification operations may have the same values for average G-ratio, average material removal rate, average kerf, and average specific grinding energy.

In a particular embodiment of the method of the present disclosure, separating can include a cutting operation and a surface-modification process, wherein the cutting operation may be conducted simultaneously with the surface-modification process. In one non-limiting example, simultaneous surface-modification and cutting operations may utilize particular process parameters. For example, according to one embodiment, the process of separating and surface-modification can be conducted at a total average material removal rate for both operations of at least 1 in$^3$/min per inch (i.e., 1 in$^2$/min) and not greater than 10 in$^3$/min per inch (i.e., 10 in$^2$/min). In one non-limiting embodiment, the total average material removal rate can be at least 1.5 in$^2$/min or at least 2 in$^2$/min or at least 2.5 in$^2$/min or at least 3 in$^2$/min or at least 3.5 in$^2$/min or at least 4 in$^2$/min or at least 4.5 in$^2$/min or at least 5 in$^2$/min or at least 5.5 in$^2$/min or at least 6 in$^2$/min or at least 6.5 in$^2$/min or at least 7 in$^2$/min or at least 7.5 in$^2$/min or at least 8 in$^2$/min or at least 8.5 in$^2$/min. In still another non-limiting embodiment, the total average material removal rate can be not greater than 9.8 in$^2$/min, such as not greater than 9.5 in$^2$/min or not greater than 9 in$^2$/min or not greater than 8.5 in$^2$/min or not greater than 8 in$^2$/min or not greater than 7.5 in$^2$/min or not greater than 7 in$^2$/min or not greater than 6.5 in$^2$/min or not greater than 6 in$^2$/min or not greater than 5.5 in$^2$/min or not greater than 5 in$^2$/min or not greater than 4.5 in$^2$/min or not greater than 4 in$^2$/min or not greater than 3.5 in$^2$/min or not greater than 3 in$^2$/min or not greater than 2.5 in$^2$/min or not greater than 2 in$^2$/min. It will be appreciated that the total average material removal rate can be within a range including any of the minimum and maximum values noted above, such as within a range of at least 1.5 in$^2$/min to not greater than 10 in$^2$/min or within a range of at least 2 in$^2$/min to not greater than 10 in$^2$/min or within a range of at least 3 in$^2$/min to not greater than 10 in$^2$/min or within a range of at least 5 in$^2$/min to not greater than 10 in$^2$/min.

In another non-limiting aspect, for those processes using a simultaneous cutting and surface-modification operation, the total average kerf can be controlled and may facilitate improved processing and also improved quality of the first and second parts 121 and 122. For example, the total average kerf can be at least 0.002 inches, such as at least 0.003 inches or at least 0.005 inches or at least 0.008 inches or at least 0.01 inches or at least 0.03 inches or at least 0.05 inches or at least 0.08 inches or at least 0.1 inches or at least 0.15 inches or at least 0.18 inches or at least 0.2 inches. In still another non-limiting embodiment, the total average kerf can be not greater than 0.25 inches or not greater than 0.22 inches or not greater than 0.2 inches or not greater than 0.18 inches or not greater than 0.15 inches or not greater than 0.13 inches or not greater than 0.1 inches or not greater than 0.08 inches or not greater than 0.05 inches or not greater than 0.03 inches or not greater than 0.01 inches or not greater than 0.008 inches or not greater than 0.005 inches. It will be appreciated that the total average kerf can be within a range including any of the minimum and maximum values noted above, such as within a range of at least 0.002 inches to not greater than 0.2 inches or within a range of at least 0.003 inches to not greater than 0.15 or within a range of at least 0.005 inches to not greater than 0.1 inches or within a range of at least 0.005 inches to not greater than 0.08 inches.

According to another non-limiting embodiment, for those processes using a simultaneous cutting and surface-modification operation, the total average specific grinding energy can be controlled and may facilitate improved processing and also improved quality of the first and second parts 121 and 122. For example, in one embodiment, the total average specific grinding energy can be at least 1 hp-min/in³, such as at least 2 hp-min/in³ or at least 3 hp-min/in³ or at least 5 hp-min/in³ or at least 8 hp-min/in³ or at least 10 hp-min/in³ or at least 12 hp-min/in³ or at least 15 hp-min/in³ or at least 18 hp-min/in³ or at least 20 hp-min/in³ or at least 23 hp-min/in³ or at least 25 hp-min/in³ or at least 28 hp-min/in³ or at least 30 hp-min/in³ or at least 33 hp-min/in³ or at least 35 hp-min/in³. Still, in another non-limiting embodiment, the total average specific grinding energy may be not greater than 50 hp-min/in³ or not greater than 40 hp-min/in³ or not greater than 38 hp-min/in³ or not greater than 35 hp-min/in³ or not greater than 33 hp-min/in³ or not greater than 30 hp-min/in³ or not greater than 28 hp-min/in³ or not greater than 25 hp-min/in³ or not greater than 23 hp-min/in³ or not greater than 20 hp-min/in³ or not greater than 18 hp-min/in³ or not greater than 15 hp-min/in³ or not greater than 13 hp-min/in³ or not greater than 10 hp-min/in³ or not greater than 8 hp-min/in³ or not greater than 5 hp-min/in³. It will be appreciated that the total average specific grinding energy can be within a range including any of the minimum and maximum values noted above, such as within a range of at least 1 hp-min/in³ to not greater than 40 hp-min/in³ or within a range of at least 2 hp-min/in³ to not greater than 30 hp-min/in³ or within a range of at least 3 hp-min/in³ to not greater than 25 hp-min/in³.

For those processes using a simultaneous cutting and surface-modification operation, the total average G-ratio may be controlled and may facilitate improved processing and also improved quality of the first and second parts 121 and 122. For example, the total average G-ratio may be at least 10, such as at least 20 or at least 50 or at least 100 or at least 200 or at least 300 or at least 400 or at least 500 or at least 600 or at least 700 or at least 800 or at least 900. In still another non-limiting embodiment, the total average G-ratio may be not greater than 1000, such as not greater than 900 or not greater than 800 or not greater than 700 or not greater than 600 or not greater than 500 or not greater than 400 or not greater than 300 or not greater than 200. It will be appreciated that the G-ratio may be within a range including any of the minimum and maximum values noted above.

According to one embodiment, at least a portion of the surface 510 of the second part 122 may be finished to a particular specification suitable for re-using the second part 122 as a build plate. For example, in one non-limiting embodiment, the process of finishing can include finishing the surface 510 to an average surface roughness (Ra) of not greater than 50 microns, such as not greater than 45 microns or not greater than 40 microns or not greater than 35 microns or not greater than 30 microns or not greater than 25 microns or not greater than 20 microns or not greater than 18 microns or not greater than 15 microns or not greater than 12 microns or not greater than 10 microns or not greater than 8 microns or not greater than 5 microns or not greater than 2 microns or not greater than 1 micron. Still, in another non-limiting embodiment, the surface 510 may be finished to an average surface roughness (Ra) of at least 0.1 microns or at least 0.5 microns or least 1 micron or at least 3 microns or at least 5 microns or at least 10 microns or at least 15 microns or at least 20 microns. It will be appreciated that the average surface roughness (Ra) can be within a range including any of the minimum and maximum values noted above.

In another non-limiting embodiment, the process of finishing may include finishing the surface 510 to a particular flatness. For example, in one embodiment, the average flatness of the surface 510 after the finishing operation can be not greater than 200 microns, such as not greater than 180 microns or not greater than 160 microns or not greater than 140 microns or not greater than 120 microns or not greater than 100 microns or not greater than 80 microns or not greater than 60 microns or not greater than 40 microns or not greater than 20 microns or not greater than 10 microns. Still, in one non-limiting embodiment, the average flatness can be at least 0.1 microns or at least 0.5 microns or at least 1 micron or at least 5 microns or at least 10 microns or at least 20 microns or at least 30 microns or at least 40 microns or at least 50 microns. It will be appreciated that the average flatness can be within a range including any of the minimum and maximum values noted above.

The average flatness may also be reported as a normalized average flatness wherein the flatness value is divided by the area of the surface 510. For example, in one embodiment the average normalized flatness of the surface 510 after the finishing operation can be not greater than 0.5 microns/cm², such as not greater than 0.4 microns/cm² or not greater than 0.3 microns/cm² or not greater than 0.2 microns/cm² or not greater than 0.15 microns/cm² or not greater than 0.1 microns/cm² or not greater than 0.05 microns/cm² or not greater than 0.01 microns/cm² or not greater than 0.005 microns/cm² or not greater than 0.001 microns/cm² or not greater than 0.0005 microns/cm². Still, in one non-limiting embodiment, the average normalized flatness can be at least 0.00001 microns/cm² or at least 0.0001 microns/cm² or at least 0.001 microns/cm² or at least 0.01 microns/cm² or at least 0.1 microns/cm². It will be appreciated that the average flatness can be within a range including any of the minimum and maximum values noted above. Normalized flatness is typically measured over a surface area of at least 10 cm², and more particularly at least 100 cm² or even at least 500 cm².

In one non-limiting aspect, the finishing operation, including simultaneous or independent surface-modification operation may be conducted under particular conditions. For example, in one non-limiting embodiment, the operation may be conducted at a wheel speed of at least 10 and not greater than 100 m/s. In another non-limiting embodiment, the operation may be conducted at a feed rate of at least 1 mm/min and not greater than 2000 mm/min. According to another non-limiting embodiment, the operation may be completed using a depth of cut of at least 10 microns and not greater than 300 microns. In at least one embodiment, but not necessarily all embodiments, two or more of the above conditions may be utilized in combination.

Referring now to FIGS. 7A-7E, the joint region may be formed with one or more features to assist in the finishing operation. For example, in one or more optional embodiments, one or more markings, features and/or identifying structures may be part of the joint regions 123. In one embodiment, the one or more markings, features, and/or identifying structures associated with the joint regions 123 may be used to control one or more aspect of the deterministic process. For example, in one optional embodiment, the one or more markings, features, and/or identifying structures may be a component of the part data that is used to develop the deterministic process and model for conducting the finishing operation.

In certain instances, the one or more markings, features or identifying structures may be formed during or after the additive manufacturing process to form the joint regions 123. In one aspect, forming the at least one joint region can include forming a surface feature in the at least one joint region 123, wherein the surface feature can be used to identify the position and orientation of the joint region 123 relative to the first part 121 and/or second part 122.

In one non-limiting embodiment, the markings, features or identifying structures on the joint regions 123 can be detectable by at least one sensor, and wherein the sensor may be configured to send sensor data to a computing device that will develop the deterministic process based on the sensor data related to the markings, features or identifying structures on the joint regions 123. In still another embodiment, the markings, features or identifying structures may be sized, shaped, and/or oriented in the joint region 123 to improve the separation process.

Figure 7A:
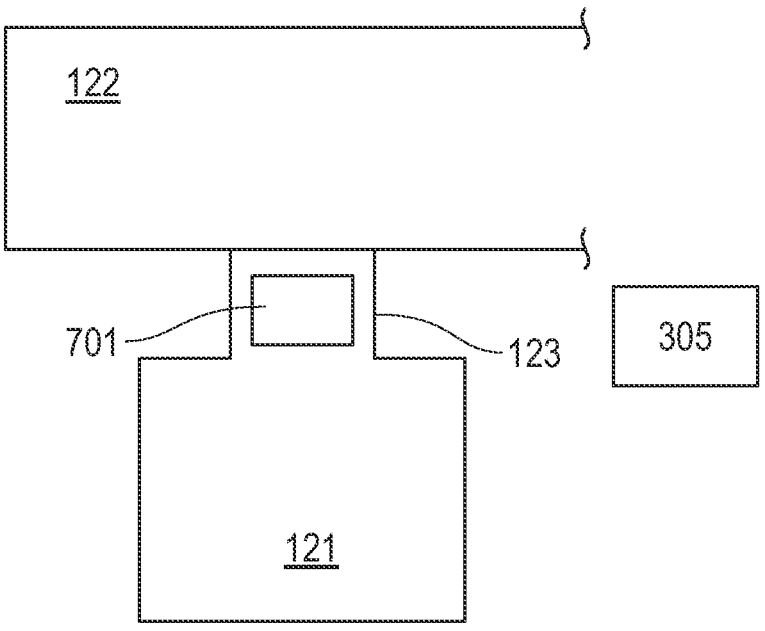
FIGS. 7A-7E include illustrations of features of a joint region according to embodiments herein.

FIG. 7A includes an illustration of a first part 121, a second part 122, a joint region 123 including a marking 701 and a sensor 305. In one embodiment, the marking 701 can be on the surface of the joint region 123. In another embodiment, the marking 701 may include a material that is different than the material of the joint region 123, such that the marking 701 is readily identifiable by the sensor 305. For example, in one embodiment, the marking 701 may have a certain reflectivity to a given wavelength of electromagnetic radiation that assists an optical sensor with identifying the joint region 123.

In an alternative embodiment, the marking 701 can be a blind hole or aperture in the joint region 123 that may assist with identifying the position and size of the joint region and also facilitating improved separation of the first part 121 from the second part 122.

Figure 7B:
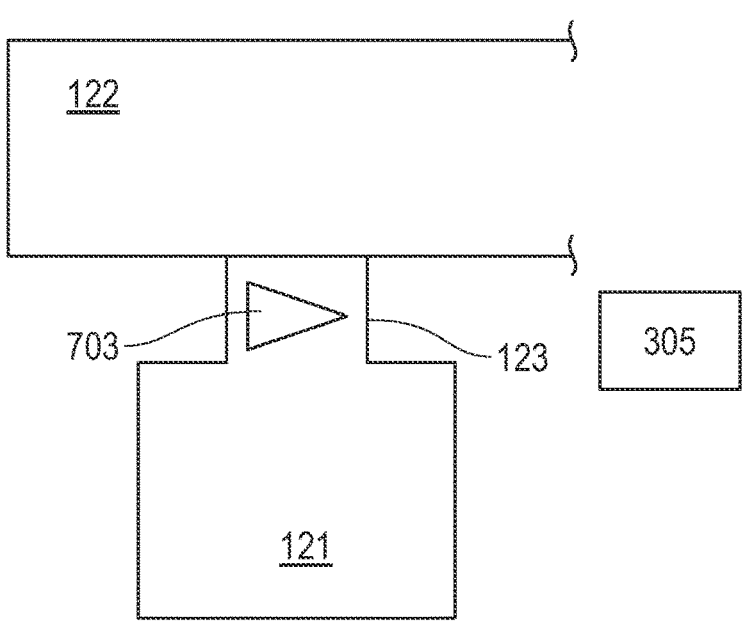

FIG. 7B includes an illustration of a first part 121, a second part 122, a joint region 123 including a marking 703 and a sensor 305. As illustrated, in one optional embodiment, the marking 703 can have a shape (e.g., an arrow) that may provide information regarding the preferred direction of separation. The marking 703 may be a surface feature or shape that extends into the body of the joint region 123 below the surface (e.g., blind hole or aperture).

Figure 7C:
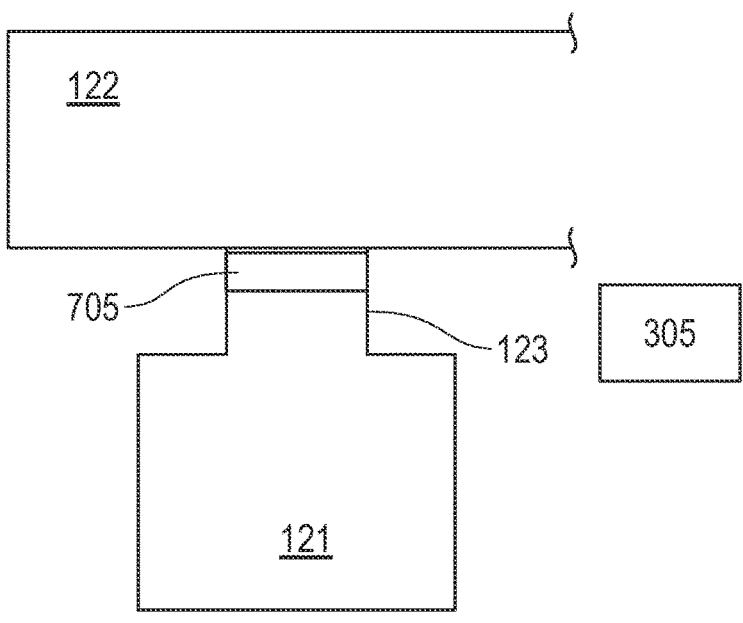

FIG. 7C includes an illustration of a first part 121, a second part 122, a joint region 123 including a marking 705 and a sensor 305. As illustrated in the embodiment of FIG. 7C, the marking 705 may provide a preferred path or envelop in which to conduct the separating process. The marking 705 may be used during the separation process to measure the accuracy of the separation process, which can be detected by the sensor, which can provide data to one or more computing devices, which may make changes to the separating process depending upon how well the separation process is adhering to the preferred path or envelop. It will be appreciated that the marking 705 may be a surface feature or shape that extends into the body of the joint region 123 below the surface (e.g., blind hole or aperture).

Figure 7D:
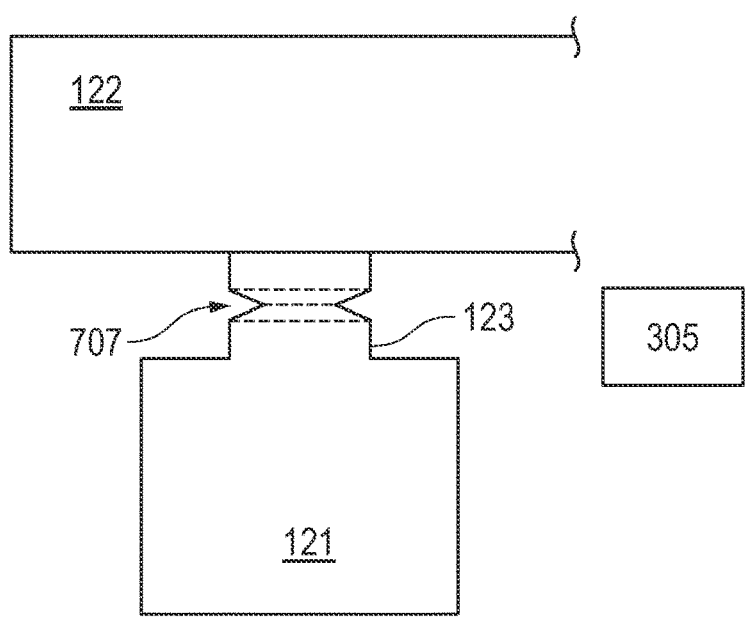

FIG. 7D includes an illustration of a first part 121, a second part 122, a joint region 123 including a feature 707 and a sensor 305. As illustrated in the embodiment of FIG. 7D, the feature 707 may have a particular surface contour, such as a groove or depression that identifies a preferred path or envelop in which to conduct the separating process. In one embodiment, the size and shape of the contour, such as a groove, may be particularly selected in light of the expected fixed abrasive article and separation process, which may facilitate improved separation. Like the other markings and features of the joint regions described in the embodiments herein, the feature 707 may be used during the separation process to measure the accuracy of the separation process, which can be detected by the sensor, which can provide data to one or more computing devices, which may make changes to the separating process.

Figure 7E:
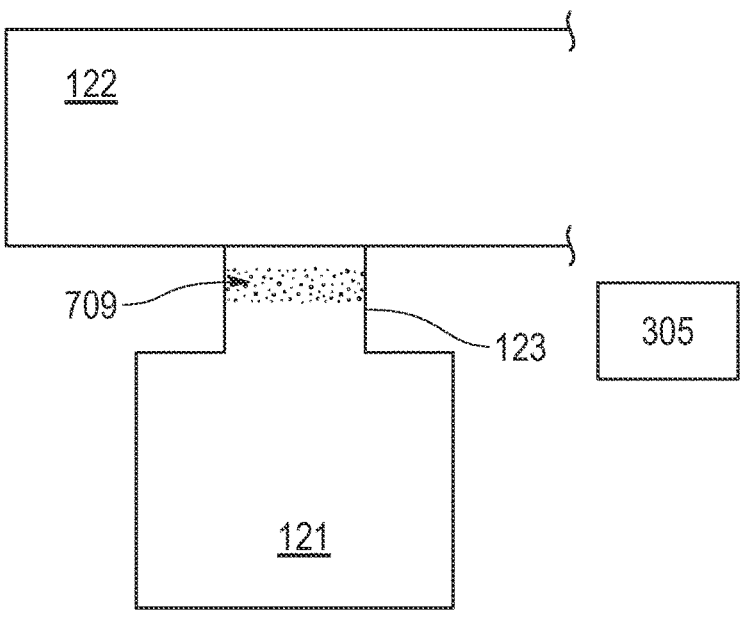

FIG. 7E includes an illustration of a first part 121, a second part 122, a joint region 123 including a feature 709 and a sensor 305. According to one embodiment, a joint region 123 may be formed to have a feature 709 in the form of a region within the joint region 123 of a different structure or morphology as compared to other portions of the joint region 123 and/or first part 121. The feature 709 may be a region that provides sufficient strength to conduct the additive manufacturing process, but may be selectively weaker than surrounding regions, which may assist with the separation process. For example, in one embodiment, the feature 709 may include a region of greater porosity or additives that may selectively weaken the region (e.g., microcapsules of organic material that may volatilize in the heat of the separation process). In still another embodiment, the feature 709 may include a region that under certain orientations can allow for some tension or extension of the joint region 123 that may further facilitate the separation process. Some non-limiting examples of differences in morphology that may exist in the feature 709 include a difference in porosity content, porosity shape, porosity size, porosity distribution as compared to the porosity in the rest of the joint region 123 and/or first part 121. Other aspects of difference in morphology that may be associated with the feature 709 can include difference in density, material composition and the like. It will be appreciated that a joint region can include any one or more markings, features, and/or identifying structures described in embodiments herein.

The same or similar processes can be applied to additive manufactured components that do not necessarily need a second part (e.g., build plate) and corresponding joint regions. In some additive manufacturing operations, the first part including the additive manufactured component can be formed as free-standing bodies. In other instances, additive manufacturing is used to repair a defect or damaged portion of a previously formed body. In either of these instances, the present processes may be used to conduct one or more material removal operations, such as surface grinding and/or surface-modification of additively manufactured regions or parts.

Figure 8A:
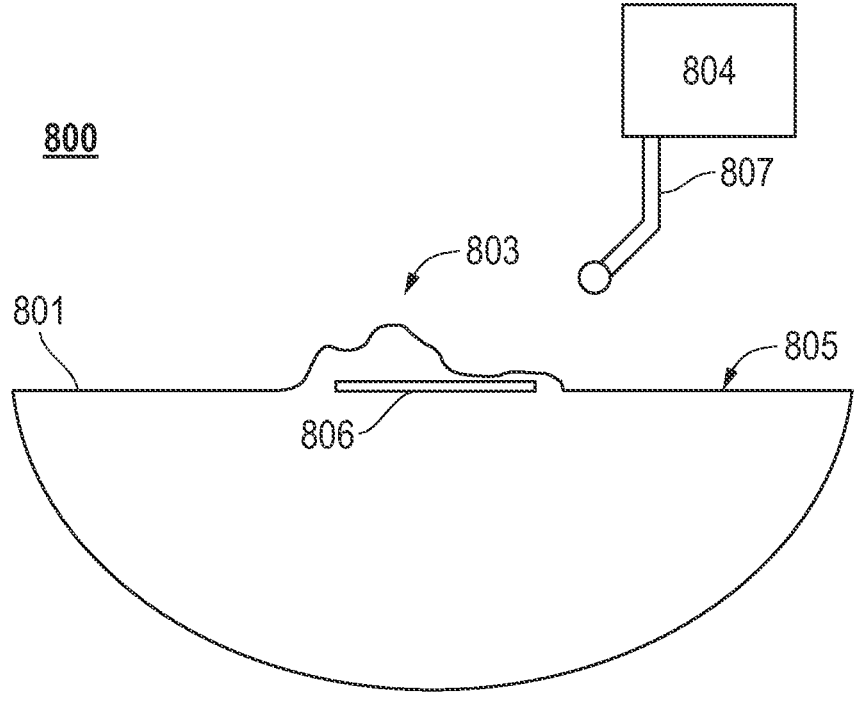
FIG. 8A includes an illustration of a portion of a first part formed via additive manufacturing according to an embodiment.

FIG. 8A includes an illustration of a portion of a first part formed via additive manufacturing according to an embodiment. As illustrated, the first part 800 can include a body 801 including a region 803 defined by excess material extending from the surface 805 that may be suitable for removing via a material removal operation.

According to one embodiment, the process for finishing the body 801 may include forming the first part 800 or a portion of the first part including the region 803 via additive manufacturing. In certain non-limiting examples, the process for finishing does not necessarily need to include the forming process. In some instances, the part 800 may already be formed and simply supplied to a system for finishing.

After forming or providing the first part 800, the process can continue by finishing the region 803 of the first part 800 to a preferred contour or tolerance. The process for finishing the region can include identifying the region 803 and creating a deterministic process for changing the region 803 to a desired contour or tolerance via one or more fixed abrasives. In one embodiment, the process for identifying the region 803 can include using one or more sensors 804, which may optionally include one or more probes 807 or may optionally use an optical sensor, which can assist in identifying regions 803 having an unsuitable contour or tolerance. In another optional embodiment, the region 803 may include a marking, feature and/or identification structure 806 to assist with identification of the region 803 and the development of the deterministic process used to finish the region 803.

The process for creating the deterministic process can include any of the features of the embodiments herein for creating a model. For example, one or more computing devices can be configured to generate one or more deterministic processes based on at least one of part data, historical data, data related to the types of fixed abrasives available, the wear status of one or more fixed abrasive articles, environmental data, sensor data, performance data, or any combination thereof. The model may be used to control the selection of one or more fixed abrasive articles from a magazine to finish the region 803 to the desired contour and/or tolerance.

Figure 8B:
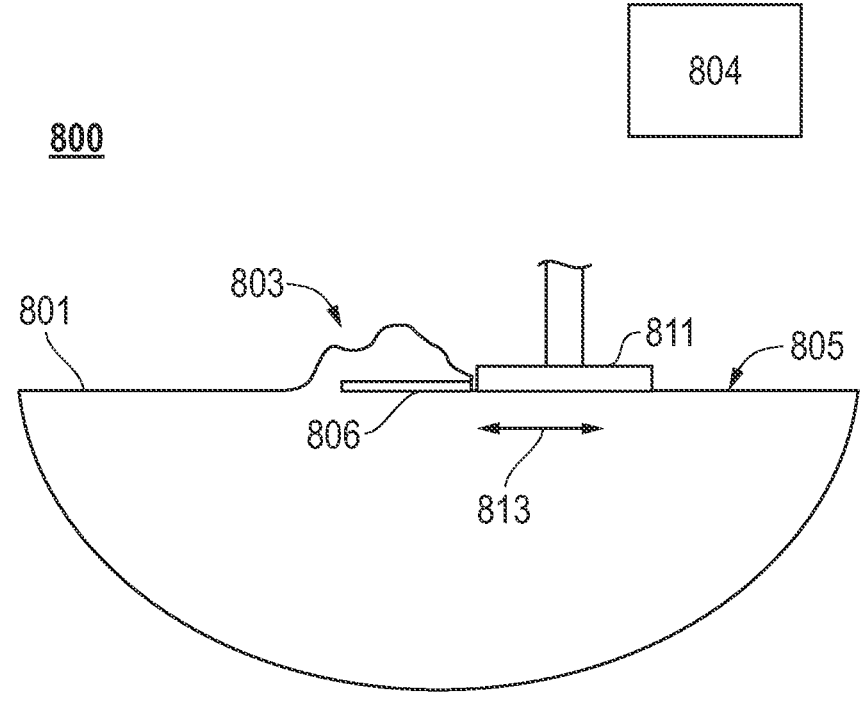
FIG. 8B includes an illustration of a portion of a first part formed via additive manufacturing during a material removal operation according to an embodiment.

FIG. 8B includes an illustration of a portion of a first part formed via additive manufacturing during a material removal operation according to an embodiment. The process for finishing the region 803 can include any of the methods, systems, and fixed abrasive articles of the embodiments herein. As illustrated, the fixed abrasive article 811 and/or the first part 800 can be moved relative to each other in the directions 813 to conduct a suitable material removal operation of the region 803.

EMBODIMENTS

Embodiment 1. A method for conducting an abrasive operation comprising: providing a fixed abrasive article including abrasive particles contained in a bond material; and separating a first part from a second part using the fixed abrasive article operated according to a deterministic process, wherein the first part comprises an additive manufactured component.

Embodiment 2. The method of embodiment 1, wherein providing a fixed abrasive article includes selecting a first fixed abrasive article from a magazine, the magazine including a plurality of different types of fixed abrasive articles.

Embodiment 3. The method of embodiment 1, wherein providing a fixed abrasive article includes selecting a fixed abrasive article based on part data, wherein part data includes information related to at least one of an orientation of the first part, a size of the first part, a shape of the first part, a composition of the first part, an orientation of the second part, a size of the second part, a shape of the second part, a composition of the second part, an orientation of at least one joint region between the first part and second part, a size of at least one joint region between the first part and second part, a shape of at least one joint region between the first part and the second part, a composition of at least one joint region between the first part and the second part, or any combination thereof.

Embodiment 4. The method of embodiment 1, wherein providing a fixed abrasive article includes selecting a first fixed abrasive article via an end effector.

Embodiment 5. The method of any one of embodiments 2, 3, or 4, wherein selecting includes confirming the type of abrasive article selected by reading indicia data associated with the abrasive article.

Embodiment 6. The method of embodiment 1, wherein the deterministic process includes a separation model configured to control a path of the fixed abrasive article.

Embodiment 7. The method of embodiment 6, wherein the separation model is created based upon at least one of part data, historical data, data related to the types of fixed abrasive articles available, a wear status of one or more fixed abrasive articles, environmental data, or any combination thereof.

Embodiment 8. The method of embodiment 1, wherein the deterministic process includes a finishing model configured to control a path of motion of at least one of the first part or the second part relative to the fixed abrasive article.

Embodiment 9. The method of embodiment 1, wherein the deterministic process includes moving the fixed abrasive article relative to a stationary position of at least one of the first part or the second part.

Embodiment 10. The method of embodiment 1, wherein the deterministic process includes moving at least one of the first part or second part relative to a stationary position of the fixed abrasive article.

Embodiment 11. The method of embodiment 10, wherein moving at least one of the first part or the second part includes engaging at least one of the first part or the second part with an end effector configured to manipulate the first part or the second part relative to the fixed abrasive article.

Embodiment 12. The method of embodiment 1, wherein the deterministic process includes independently moving at least one of the first part or the second part and independently moving the fixed abrasive article.

Embodiment 13. The method of embodiment 1, wherein the deterministic process includes a single-pass finishing operation.

Embodiment 14. The method of embodiment 1, wherein the deterministic process includes a single-pass cutting operation and a single-pass surface surface-modification operation conducted simultaneously.

Embodiment 15. The method of embodiment 1, wherein the deterministic process includes a single-pass cutting operation and a single-pass surface surface-modification operation conducted separately from each other.

Embodiment 16. The method of embodiment 15, wherein the single pass cutting operation is conducted along a different path direction as compared to the single-pass surface surface-modification operation.

Embodiment 17. The method of embodiment 1, wherein the deterministic process includes one or more separation models configured to be presented to a user for selection via at least one user interface.

Embodiment 18. The method of embodiment 1, wherein the deterministic process is configured to be adapted during separating by one or more of sensor data, performance data, force data, displacement data, or any combination thereof.

Embodiment 19. The method of embodiment 1, wherein separating includes removing material at an average material removal rate within a range of at least 1 in²/min and not greater than 10 in²/min.

Embodiment 20. The method of embodiment 1, wherein separating includes removing material with an average kerf within a range of at least 0.002 inches and not greater than 0.25 inches.

Embodiment 21. The method of embodiment 1, wherein separating includes removing material at a specific grinding energy of at least 1 hp-min/in3 and not greater than 40 hp-min/in3.

Embodiment 22. The method of embodiment 1, wherein separating includes removing material at a G-ratio of at least 10 and not greater than 1000.

Embodiment 23. The method of embodiment 1, wherein separating includes a cutting operation and a surface-modification operation conducted simultaneously with the fixed abrasive article.

Embodiment 24. The method of embodiment 1, wherein separating includes a cutting operation and a surface-modification operation conducted at separate times, wherein the cutting operation and surface-modification operation are conducted with the fixed abrasive article.

Embodiment 25. The method of embodiment 1, wherein separating includes a cutting operation and a surface-modification operation conducted at separate times and wherein the cutting operation is conducted with the fixed abrasive article and the surface-modification operation is conducted with a second fixed abrasive article different from the fixed abrasive article.

Embodiment 26. The method of embodiment 1, wherein separating includes a cutting operation and a surface-modification operation, wherein the cutting operation is conducted simultaneously with the surface-modification operation, and simultaneous surface-modification and cutting operations include at least one of: a total average material removal rate for both operations is within a range of at least 1 $in^2$/min and not greater than 10 $in^2$/min; a total average kerf within a range of at least 0.002 inches and not greater than 0.25 inches; a total average specific grinding energy of at least 1 hp-min/$in^3$ and not greater than 40 hp-min/$in^3$; a total average G-ratio within a range of at least 10 and not greater than 1000; or a combination thereof.

Embodiment 27. The method of embodiment 1, wherein separating includes a cutting operation and a surface-modification operation, wherein the cutting operation is conducted separately from the surface-modification operation, and wherein the cutting operation comprises at least one of: an average material removal rate that is greater than an average material removal rate of the surface-modification operation; an average specific grinding energy that is greater than an average specific grinding energy of the surface-modification operation; an average G-ratio that is greater than an average G-ratio of the surface-modification operation; or any combination thereof.

Embodiment 28. The method of embodiment 1, wherein separating includes a cutting operation and a surface-modification operation, wherein the cutting operation is conducted separately from the surface-modification operation, and wherein the cutting operation comprises at least one of: an average material removal rate within a range of at least 1 $in^2$/min and not greater than 10 $in^2$/min; an average kerf within a range of at least 0.002 inches and not greater than 0.25 inches; an average specific grinding energy of at least 1 hp-min/$in^3$ and not greater than 40 hp-min/$in^3$; an average G-ratio within a range of at least 10 and not greater than 1000; or any combination thereof.

Embodiment 29. The method of embodiment 1, wherein separating includes a cutting operation and a surface-modification operation, wherein the cutting operation is conducted separately from the surface-modification operation, and wherein the surface-modification operation comprises at least one of: an average material removal rate within a range of at least 1 $in^2$/min and not greater than 10 $in^2$/min; an average specific grinding energy of at least 1 hp-min/$in^3$ and not greater than 40 hp-min/$in^3$; an average G-ratio within a range of at least 10 and not greater than 1000; a finished average surface roughness within a range of at least 0.1 microns and not greater than 50 microns; a finished normalized average flatness within a range of at least 0.00001 microns/$cm^2$ and not greater than 0.5 microns/$cm^2$; or any combination thereof.

Embodiment 30. The method of embodiment 1, wherein separating includes creating progress data, and wherein progress data is used to control at least one of orientation of the first part relative to the second part, the position of one or more end effectors engaged with the first part or the second part, or a combination thereof.

Embodiment 31. The method of embodiment 1, wherein separating includes creating progress data configured to control release of the first part from the second part.

Embodiment 32. The method of embodiment 1, wherein the abrasive particles include at least one of oxides, carbides, nitrides, borides, superabrasives, agglomerates, unagglomerated particles, shaped abrasive particles, randomly-shaped abrasive particles, or any combination thereof.

Embodiment 33. The method of embodiment 1, wherein the fixed abrasive includes a coated abrasive, bonded abrasive, or any combination thereof.

Embodiment 34. The method of embodiment 1, wherein the bond material includes a ceramic material, metal material, polymeric material, vitreous material, monocrystalline material, polycrystalline material, amorphous material, or any combination thereof.

Embodiment 35. The method of embodiment 1, further comprising forming at least one joint region between the first part and the second part via additive manufacturing prior to separating.

Embodiment 36. The method of embodiment 35, wherein forming the at least one joint region includes forming at least one marking on the at least one joint region, wherein the marking is used to control a parameter of the deterministic process.

Embodiment 37. The method of embodiment 36, wherein the at least one marking is detectable by at least one sensor, and wherein the sensor is configured to send sensor data to a processor to develop the deterministic process.

Embodiment 38. The method of embodiment 35, wherein forming the at least one joint region includes forming a surface feature in the at least one joint region, wherein the surface feature is used to identify the position and orientation of the joint region and wherein the surface features optionally controls a parameter of the deterministic process.

Embodiment 39. The method of embodiment 35, wherein forming the at least one joint region includes forming a region of a different morphology as compared to a body of the first part formed via additive manufacturing.

Embodiment 40. The method of embodiment 39, wherein the different morphology includes at least one of a different porosity content, different porosity shape, different porosity size, different pore size distribution, different density, different composition, or any combination thereof.

Embodiment 41. The method of embodiment 1, wherein separating includes simultaneously surface-modification at least a portion of a surface of the second part to a predetermined surface value.

Embodiment 42. The method of embodiment 41, wherein simultaneously surface-modification includes finishing the portion of the second part to an average surface roughness (Ra) of not greater than 50 microns.

Embodiment 43. The method of embodiment 41, wherein simultaneous finishing includes finishing the portion of the second part to a normalized flatness of not greater than 0.5 microns/$cm^2$.

Embodiment 44. The method of embodiment 41, wherein simultaneous finishing includes at least one of: a wheel speed of at least 10 and not greater than 100 m/s; a feed rate of at least 1 mm/min and not greater than 2000 mm/min, a depth of cut of at least 10 microns and not greater than 300 microns; or any combination thereof.

Embodiment 45. The method of embodiment 41, wherein simultaneous finishing comprises: measuring at least one surface value associated with a finished surface of the second part during separating and generating performance data; and adapting the deterministic process based upon the performance data.

Embodiment 46. The method of embodiment 1, wherein the first part comprises an inorganic material.

Embodiment 47. The method of embodiment 1, wherein the first part comprises a polycrystalline or amorphous material.

Embodiment 48. The method of embodiment 1, wherein the first part comprises a metal or metal alloy.

Embodiment 49. The method of embodiment 1, wherein the second part comprises a metal or metal alloy.

Embodiment 50. The method of embodiment 1, wherein the second part comprises a same metal material as the first part.

Embodiment 51. The method of embodiment 1, wherein the second part is a build plate having a surface suitable for formation of the first part via additive manufacturing.

Embodiment 52. The method of embodiment 1, wherein the build plate comprises a length that is greater than a diameter of the fixed abrasive article.

Embodiment 53. The method of embodiment 1, wherein the build plate comprises a width that is greater than a diameter of the fixed abrasive article.

Embodiment 54. A system for conducting an abrasive operation comprising: a first part comprising an additive manufactured component; a second part joined to the first part by at least one joint region; and an end effector configured to engage with at least one of a fixed abrasive article, the first part or the second part, wherein the end effector is configured to move at least one of the fixed abrasive article, the first part or the second part to remove material from the at least one joint region and facilitate separation of the first part from the second part, wherein the at least one fixed abrasive article includes abrasive particles contained in a bond material.

Embodiment 55. The system of embodiment 54, further comprising an additive manufacturing housing configured to form the additive manufactured component of the first part, wherein the end effector is integrated into the additive manufacturing housing.

Embodiment 56. The system of embodiment 54, further comprising a magazine including a plurality of different types of fixed abrasive articles including the at least one fixed abrasive article.

Embodiment 57. The system of embodiment 56, wherein each different type of fixed abrasive article of the plurality of different types of fixed abrasives has unique indicia data.

Embodiment 58. The system of embodiment 57, wherein the unique indicia data includes a marking, a barcode, a matrix barcode, a number, a letter combination, a pattern, or a combination thereof.

Embodiment 59. The system of embodiment 56, wherein each different type of fixed abrasive article includes an electronic device.

Embodiment 60. The system of embodiment 59, wherein the electronic device includes a wireless communication device including a logic element and an antenna.

Embodiment 61. The system of embodiment 59, wherein the electronic device comprises at least one of a passive radio frequency identification (RFID) tag, an active radio frequency identification (RFID) tag, a sensor, a passive near-field communication device (passive NFC), an active near-field communication device (active NFC), or any combination thereof.

Embodiment 62. The system of embodiment 57, wherein the unique indicia data is present as a machine-readable medium, the system further comprising at least one sensor configured to read the machine-readable medium and send the unique indicia data to a computing device to confirm the type of fixed abrasive article engaged with the end effector.

Embodiment 63. The system of embodiment 62, wherein the at least one sensor is an optical sensor.

Embodiment 64. The system of embodiment 54, further comprising a finishing system including a finishing housing including the end effector and the at least one fixed abrasive, wherein the finishing housing is separate from an additive manufacturing housing configured for forming the additive manufactured component of the first part.

Embodiment 65. The system of embodiment 64, further comprising at least one transfer mechanism configured to transfer the first part and second part from an additive manufacturing system to the finishing system.

Embodiment 66. The system of embodiment 64, further comprising at least one computing device for the additive manufacturing system in communication with at least one computing device associated with the finishing system, and wherein the computing device for the additive manufacturing system is configured to send part data to the computing device associated with the finishing system.

Embodiment 67. The system of embodiment 54, further comprising one or more sensors in the end effector.

Embodiment 68. The system of embodiment 67, wherein the one or more sensors include a thermal sensor, force sensor, proximity sensor, vibration sensor, acoustic sensor, power sensor, accelerometer, or any combination thereof.

Embodiment 69. The system of embodiment 68, wherein the force sensor has at least one degree of freedom.

Embodiment 70. The system of embodiment 54, further comprising a computing device in communication with the end effector and configured to control the movement of the end effector.

Embodiment 71. The system of embodiment 70, wherein the computing device includes hardware including at least one of a memory, a processor, input/output devices, a display, a keyboard, or any combination thereof.

Embodiment 72. The system of embodiment 70, wherein the computing device includes software or firmware.

Embodiment 73. The system of embodiment 70, wherein the computing device includes a processor configured to store or receive at least one of part data, historical data, data related to the types of fixed abrasives available, the wear status of one or more fixed abrasive articles, environmental data, sensor data, performance data, deterministic process data, or any combination thereof.

Embodiment 74. The system of embodiment 70, wherein the computing device includes software or firmware configured generate one or more deterministic processes based on at least one of part data, historical data, data related to the types of fixed abrasives available, the wear status of one or more fixed abrasive articles, environmental data, sensor data, performance data, or any combination thereof.

Embodiment 75. The system of embodiment 74, wherein the one or more deterministic processes includes one or more models generated by the software or firmware, and wherein the one or more models are configured to be sent to a display and presented in a user-readable medium.

Embodiment 76. The system of embodiment 74, wherein the one or more deterministic processes includes one or more models generated by the software or firmware, and wherein the one or more models are configured to be sent as machine-readable medium to a controller of the end effector.

Embodiment 77. The system of embodiment 54, further comprising a manipulator configured to engage at least one of the first part or the second part during separation of the first part from the second part.

Embodiment 78. The system of embodiment 77, wherein the manipulator is configured to change the position of at least one of the first part or the second part based on manipulator data received from a computing device.

Embodiment 79. The system of embodiment 77, wherein the manipulator and end effector are configured to move in one or more directions based on a separation model.

Embodiment 80. The system of embodiment 59, further comprising a first force controller configured to measure forces during a cutting operation and a second force controller, different from the first force controller, configured to measure forces during a surface-modification operation.

The foregoing embodiments are directed to bonded abrasive products, and particularly grinding wheels, which represent a departure from the state-of-the-art. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Reference herein to a material including one or more components may be interpreted to include at least one embodiment wherein the material consists essentially of the one or more components identified. The term "consisting essentially" will be interpreted to include a composition including those materials identified and excluding all other materials except in minority contents (e.g., impurity contents), which do not significantly alter the properties of the material. Additionally, or in the alternative, in certain non-limiting embodiments, any of the compositions identified herein may be essentially free of materials that are not expressly disclosed. The embodiments herein include range of contents for certain components within a material, and it will be appreciated that the contents of the components within a given material total 100%. The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method for conducting an abrasive operation comprising:
    providing a fixed abrasive article including abrasive particles contained in a bond material wherein providing the fixed abrasive article includes selecting a first fixed abrasive article from a magazine, the magazine including a plurality of different types of fixed abrasive articles; and
    separating a first part from a second part using the fixed abrasive article operated according to a deterministic process, wherein the first part comprises an additive manufactured component.

2. The method of claim 1, wherein providing the fixed abrasive article includes selecting the first abrasive article via an end effector and operatively coupling the fixed abrasive article to the end effectors.

3. The method of claim 1, wherein providing a fixed abrasive article includes selecting a fixed abrasive article based on part data, wherein part data includes information related to at least one of an orientation of the first part, a size of the first part, a shape of the first part, a composition of the first part, an orientation of the second part, a size of the second part, a shape of the second part, a composition of the second part, an orientation of at least one joint region between the first part and second part, a size of at least one joint region between the first part and second part, a shape of at least one joint region between the first part and the second part, a composition of at least one joint region between the first part and the second part, or any combination thereof.

4. The method of claim 1, wherein the deterministic process includes a separation model configured to control a path of the fixed abrasive article.

5. The method of claim 4, wherein the separation model is created based upon at least one of part data, historical data, data related to the types of fixed abrasive articles available, a wear status of one or more fixed abrasive articles, environmental data, or any combination thereof.

6. A method for conducting an abrasive operation comprising:
    providing a fixed abrasive article including abrasive particles contained in a bond material;
    forming at least one joint region between a first part and a second part via additive manufacturing prior to separating; and
    separating the first part from the second part using the fixed abrasive article operated according to a deterministic process, wherein the first part comprises an additive manufactured component,
    wherein forming the at least one joint region includes forming at least one marking on the at least one joint region, wherein the marking is used to control a parameter of the deterministic process.

7. The method of claim 6, wherein the deterministic process includes engaging at least one of the first part or the second part with an end effector and moving the at least one of the first part of the second part relative to a stationary position of the fixed abrasive article.

8. The method of claim 6, wherein the at least one marking is detectable by at least one sensor, and wherein the sensor is configured to send sensor data to a processor to develop the deterministic process.

9. The method of claim 1, wherein separating includes simultaneous surface-modification of at least a portion of a surface of the second part to a predetermined surface value.

10. The method of claim 9, wherein simultaneous surface-modification comprises finishing comprising:
    measuring at least one surface value associated with a finished surface of the second part during separating and generating performance data; and
    adapting the deterministic process based upon the performance data.

11. The method of claim 1, wherein the deterministic process includes moving the fixed abrasive article relative to a stationary position of at least one of the first part or the second part.

12. The method of claim 1, wherein the deterministic process includes moving at least one of the first part or second part relative to a stationary position of the fixed abrasive article.

13. The method of claim 1, wherein the deterministic process includes a single-pass finishing operation.

14. The method of claim 1, wherein the deterministic process includes a single-pass cutting operation and a single-pass surface-modification operation conducted separately from each other.

15. The method of claim 14, wherein the single pass cutting operation is conducted along a different path direction as compared to the single-pass surface-modification operation.

16. A system for conducting an abrasive operation comprising:

a first part comprising an additive manufactured component;

a second part joined to the first part by at least one joint region; and an end effector configured to engage with at least one of a fixed abrasive article, the first part or the second part, wherein the end effector is configured to move at least one of the fixed abrasive article, the first part or the second part to remove material from the at least one joint region and facilitate separation of the first part from the second part, wherein the at least one fixed abrasive article includes abrasive particles contained in a bond material; and a magazine including a plurality of different types of fixed abrasive articles including the at least one fixed abrasive article.

17. The system of claim 16, further comprising an additive manufacturing housing configured to form the additive manufactured component of the first part, wherein the end effector is integrated into the additive manufacturing housing.

18. The system of claim 16, further comprising a building assembly and a finishing assembly that integrated into a same housing, wherein the building assembly is configured to form one or more of the first parts, on or more of the second parts, one or more of the joint regions, or any combinations thereof; and wherein the finishing assembly is configured to finish at least a portion of the first part, at least a portion of the second part, at least a portion of the joint region, or any combination thereof, wherein finishing is conducted by one or more of the fixed abrasive article.

19. The system of claim 16, wherein each different type of fixed abrasive article includes an electronic device.

20. The system of claim 19, wherein the electronic device comprises at least one of a passive radio frequency identification (RFID) tag, an active radio frequency identification (RFID) tag, a sensor, a passive near-field communication device (passive NFC), an active near-field communication device (active NFC), or any combination thereof.

\* \* \* \* \*